Dec. 8, 1936.   H. E. WINANS   2,063,284
TARGET TRAP
Filed March 8, 1934   9 Sheets-Sheet 1

INVENTOR:
HENRY E. WINANS.

BY Albert J. McCauley
ATTORNEY

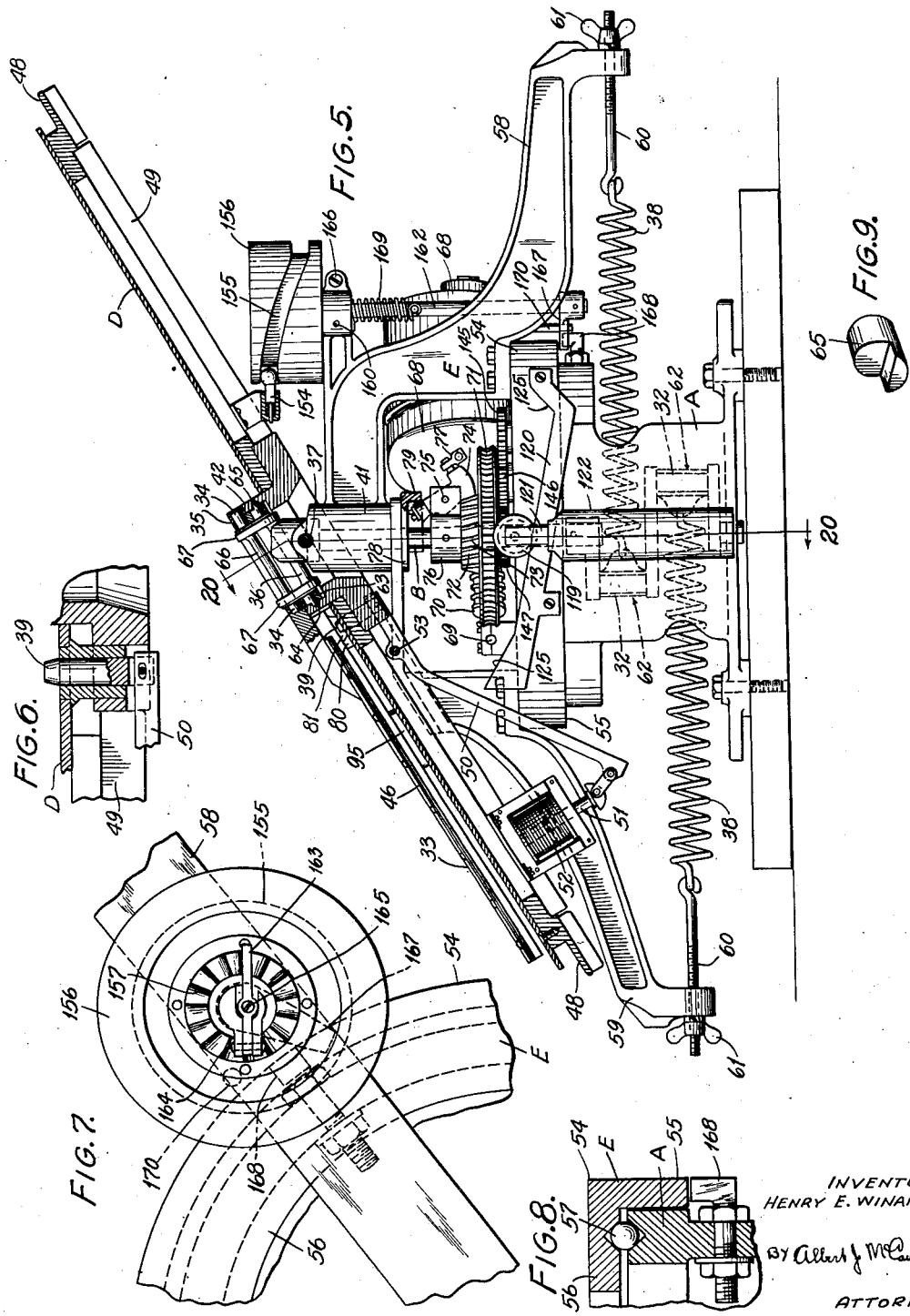

Dec. 8, 1936. H. E. WINANS 2,063,284
TARGET TRAP
Filed March 8, 1934 9 Sheets-Sheet 3
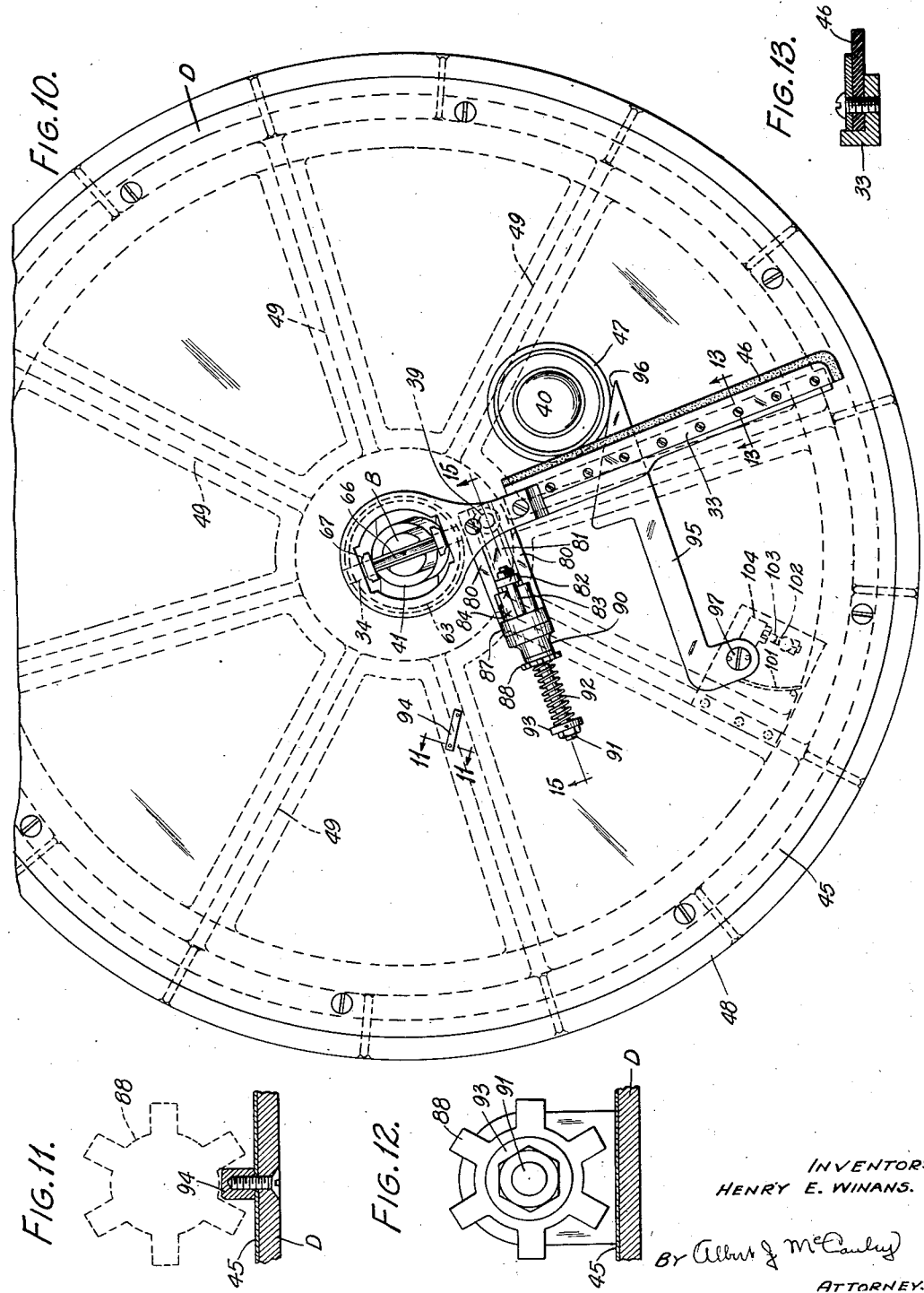
INVENTOR:
HENRY E. WINANS.
By Albert J. McCauley
ATTORNEY.

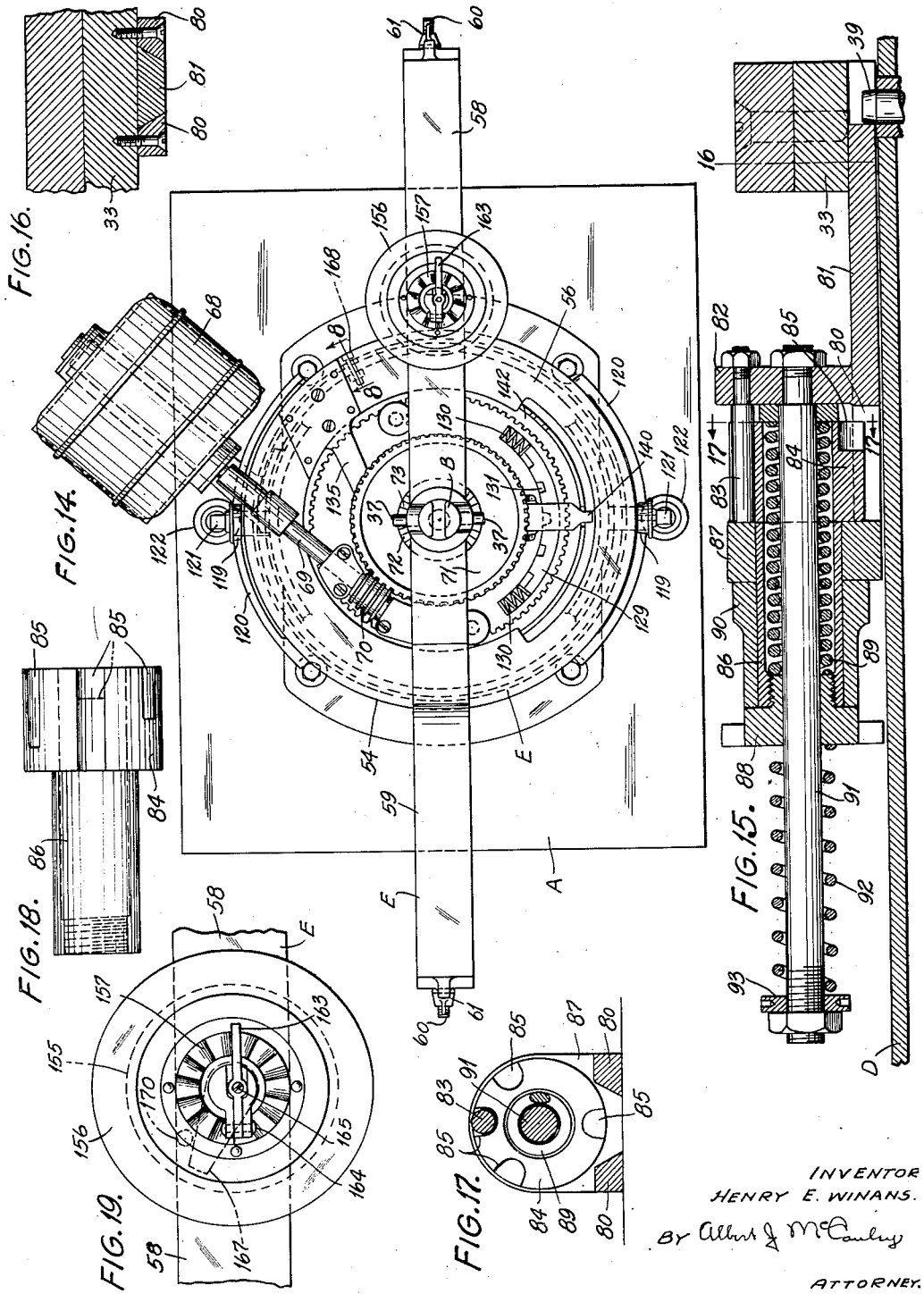

Dec. 8, 1936.  H. E. WINANS  2,063,284
TARGET TRAP
Filed March 8, 1934  9 Sheets-Sheet 5

INVENTOR
HENRY E. WINANS.
By Albert J. McCauley
ATTORNEY.

Dec. 8, 1936.     H. E. WINANS     2,063,284
TARGET TRAP
Filed March 8, 1934     9 Sheets-Sheet 6

INVENTOR:
HENRY E. WINANS.
By Albert J. McCauley
ATTORNEY.

Dec. 8, 1936.                H. E. WINANS                2,063,284
                              TARGET TRAP
                         Filed March 8, 1934            9 Sheets-Sheet 7
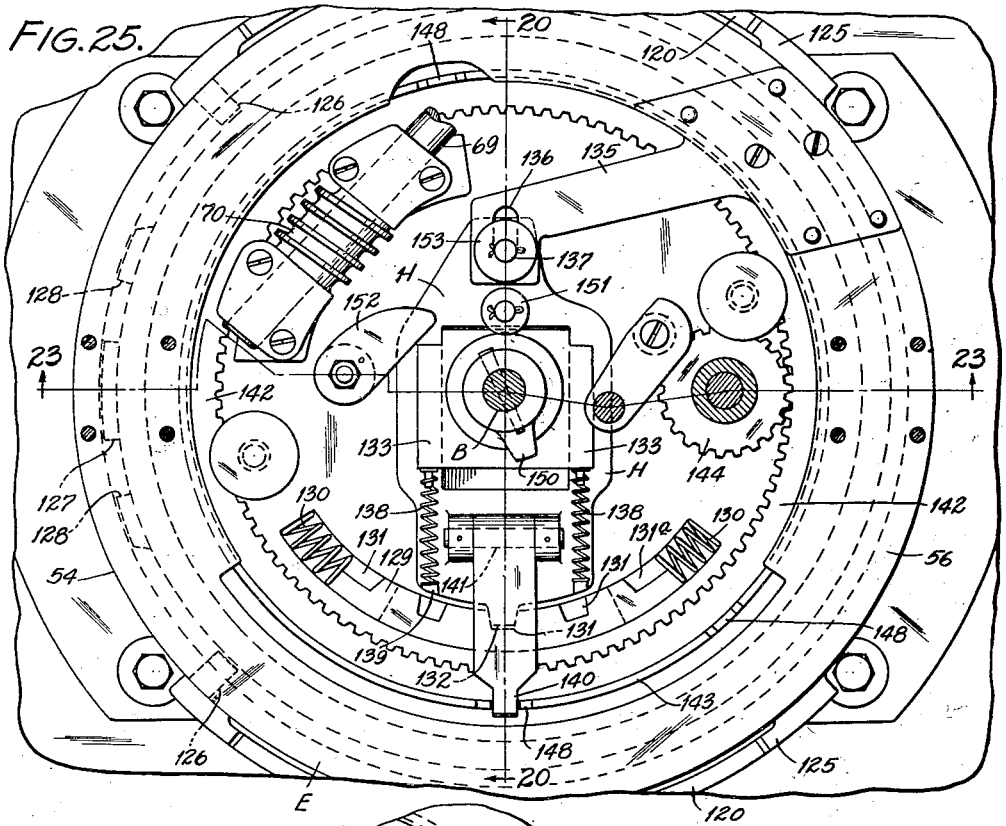
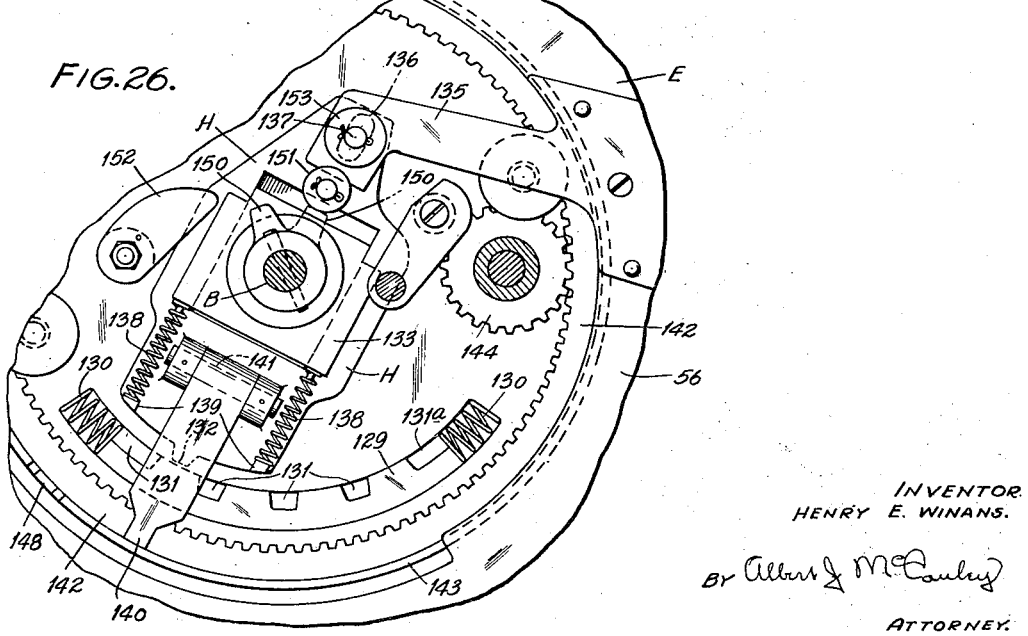
INVENTOR.
HENRY E. WINANS.
ATTORNEY.

Dec. 8, 1936.  H. E. WINANS  2,063,284
TARGET TRAP
Filed March 8, 1934  9 Sheets-Sheet 8

INVENTOR.
HENRY E. WINANS.

By Albert J. McCauley

ATTORNEY.

Dec. 8, 1936.   H. E. WINANS   2,063,284
TARGET TRAP
Filed March 8, 1934   9 Sheets-Sheet 9

INVENTOR.
HENRY E. WINANS.
BY Albert J. McCauley
ATTORNEY.

Patented Dec. 8, 1936

2,063,284

UNITED STATES PATENT OFFICE 2,063,284

TARGET TRAP

Henry E. Winans, Alton, Ill.

Application March 8, 1934, Serial No. 714,556

49 Claims. (Cl. 124—6)

This invention relates to target traps for throwing targets, such as "clay pigeons", in trap shooting contests, and also for practice in shooting at objects in flight.

One of the objects of the invention is to produce a target trap from which the targets are discharged in unexpected directions, and at unexpected velocities, corresponding to the uncertainty in the flight of birds, which suddenly arise before a hunter and quickly fly in unexpected courses at velocities that cannot be readily determined.

These results have been long recognized as highly advantageous possibilities in the designing of target traps, as they provide the conditions desired for practice, in addition to the entertainment and real tests of skill in shooting contests. However, insofar as I am aware, the previous attempts to accomplish such results have not met with complete success, as the directions of discharge have been limited to a relatively few courses within a range known to the shooters. The prior devices lack the numerous uncertainties as to directions and velocity which I have provided to closely simulate the unexpected actions of live birds.

More specifically stated, one of the objects is to discharge the targets at various angles with respect to a horizontal plane. This is accomplished by varying the angle of departure of targets leaving the trap, so as to discharge them in ascending lines at various angles to a horizontal plane. The expression "angle of elevation", meaning the angle made by an ascending line with a horizontal plane, is herein employed to describe the angle now under consideration, and I will hereafter show a means for automatically varying the angle of elevation of the throwing arm, to unexpectedly vary the corresponding angle formed by the course of the targets. In other words, the target is discharged upwardly at an unexpected angle to a horizontal plane, and this is an important feature of the present invention.

Another object is to vary the discharge of the targets with respect to a fixed line extending radially from the axis of the throwing arm. To explain this, I may state that the targets can be discharged from a point on said fixed radial line, and also from various other points at opposite sides thereof. In one form of this invention, I employ a target support movable in an arcuate course to different target-receiving positions, and a throwing arm movable over said support to discharge the targets, the discharge point being determined by the target-receiving position of the target support. More specifically stated, the target support may be a circular plate extending around the axis of the throwing arm, and both the arm and the circular plate may be stopped in various target-receiving positions to unexpectedly determine the discharge point with relation to said fixed radial line. This feature may be more or less accurately termed a variation in the radial angle, as it enables the targets to be discharged from different points on opposite sides of a radial line, and it should not be confused with the previously mentioned "angles of elevation" which refers to angles made by ascending lines with relation to a horizontal plane.

It will now be understood that each of these features is desirable in itself, independently of the other feature; and when both appear in the same target trap, so as to unexpectedly vary the "angle of elevation" as well as the "radial angle", there are many possible combinations of the different variations, enabling the targets to be discharged in numerous directions.

For example, the target may be discharged from extreme or intermediate points at opposite sides of a radial line at the trap, and they may rise at various angles to a horizontal plane. The selection of each of these directions is made automatically by mechanism in the trap, and the shooters or contestants have no advance information as to any of the selected directions.

Another object of the invention is to throw the targets at different velocities. This variation in the speeds of different targets is preferably obtained automatically through the medium of mechanism in the trap, and it corresponds to another uncertainty in the flight of live birds.

In the preferred form of the invention, a spring-actuated throwing member is employed, and the changes in velocity may be obtained by automatically varying the discharge strokes of this throwing member.

Prior to this invention, the throwing arm of the conventional target trap has been secured to a crank shaft provided with a single crank, and a spring connected to said single crank, so as to actuate the throwing arm. The single spring tends to impart lateral motion to the crank shaft, and firmly forces one side of the shaft into frictional engagement with its bearings. An object of the present invention is to improve this condition by employing a plurality of cranks and springs located at different points around the axis of the crank shafts, so as to minimize or reduce the lateral pressure at the shaft bearings, thereby providing an approximately balanced condition, wherein the energy of the springs is more uniformly distributed around the shaft. This reduces the liability of wear and breakage. It also requires less initial tension in the spring material, and provides a less violent start and smoother action of the throwing arm, so the targets are thrown more uniformly and with less liability to break during the throwing operation.

A further object is to produce a target trap having a throwing arm and a separate target support movable about the same axis. This provides a better balance, reduces vibration, increases the efficiency in throwing the target, both as to flight and less liability to break in the throwing operation. It increases the life of the trap, and also forms a compact structure well adapted for use in a small trap house.

Other advantages appear in a throwing arm which does not extend beyond the target support. This insures a proper delivery of the targets, regardless of variations in the thickness of the target bases.

A further advantage appears in a target support, preferably a circular plate, having a marginal portion beyond the path of the throwing arm, to form a protective guard, or safety device, which prevents accidental injury to persons near the throwing arm.

Another object is to provide a simple means for varying the starting positions of the targets with relation to the axis of the throwing member. In the preferred form of the invention, a throwing arm sweeps the targets over the surface of a target support, and a stop device cooperates with the throwing arm to determine the starting positions of the targets. This feature has a number of advantages. For example, if the throwing arm has a variable discharge stroke to vary the velocities of the targets, the stop device may be employed to locate the targets at different distances from the axis of the arm, depending upon the stroke of the arm, as will be hereafter described.

In a target trap having a spring-actuated throwing arm, a motor or some other source of power must be employed to tension the spring and set the throwing arm. The spring imparts a very rapid movement to the arm, and the latter usually oscillates for a brief period after the target is thrown. An object of the present invention is to provide a clutch through which the spring is energized without causing severe shocks, or strains, when the clutch is shifted to its operative position. As a specific illustration of this feature, I have shown a spring-actuated throwing arm adapted to move at varying speeds after the target is thrown, and a centrifugally-controlled clutch member which becomes effective when the speed is low enough to avoid excessive shocks in connecting the arm and spring to the source of power. The centrifugally-controlled clutch member may be carried with the throwing arm, so as to occupy an inoperative position in response to centrifugal force during rapid movements of said arm, and thereafter move to its operative position in response to a substantial decrease in the speed of the arm.

Another object is to produce a target trap having a signal device to indicate the presence of a target in the trap. As an illustration of this feature, I will hereafter describe an electrical signal, or indicator, energized in response to the delivery of a target to the trap. This signal device may include an electric lamp in the trap house exposed to the operator, and another electric lamp within the view of the shooters, or contestants, so as to notify or remind these persons of the presence of a target in the trap, at the same time indicating that the trap is set to discharge the target.

A further object is to prevent accidental, or unintentional, operation of the throwing device when there is no target in the trap. In one form of the invention, the trap is provided with a manually operated switch through which current is transmitted to release a spring-actuated throwing member, and a controlling switch movable in response to the delivery of a target to the trap, the elements being so arranged that the manual switch is ineffective unless a target is positioned to act upon the controlling switch. In other words, to release the throwing member, the current must pass through both switches, and one of them is closed by the target when the latter is properly positioned in the trap. This feature eliminates, or minimizes, injuries that may occur from accidental operation of the trap, and it tends to insure a proper location of the target in the desired starting position.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications which come within the scope of the claims hereunto appended.

Fig. 5 is a view similar to Fig. 4, showing details of the mechanism.

Fig. 6 is an enlarged fragmentary section showing the trigger pin projecting from a portion of the target-supporting table.

Fig. 7 is a top view of a portion of the means for tilting the throwing arm and target-support to vary the angle at which the targets are discharged with respect to a horizontal plane.

Fig. 8 is a section showing a stationary abutment to be engaged by a movable part of the means for tilting the target support and throwing arm.

Fig. 9 is a detail view of one of the short pins which secure the throwing arm to the target support.

Fig. 10 is a top view of the target-supporting table and throwing arm, a portion of the table being broken away.

Fig. 11 is an enlarged section on the line 11—11 in Fig. 10, showing an abutment, or tooth, which cooperates with a toothed wheel in varying the discharge stroke of the throwing arm.

Fig. 12 is an end view of the device carried by the throwing arm to vary the discharge stroke.

Fig. 13 is an enlarged transverse section of the throwing arm, taken on the line 13—13 in Fig. 10.

Fig. 14 is a top view of the trap, with the target-supporting table omitted.

Fig. 15 is a longitudinal section, showing a device for varying the discharge stroke of the throwing arm.

Fig. 16 is a section taken on the line 16 in Fig. 15.

Fig. 17 is a section taken on the line 17—17 in Fig. 15.

Fig. 18 is a detail view of the rotary stop device, which forms part of the means for varying the discharge stroke of the throwing arm.

Fig. 19 is a top view showing a ratchet device which may be employed in the means for tilting the throwing arm and target support.

Fig. 25 is a horizontal section showing various elements of the means for selecting the starting positions of the throwing arm and target support.

Fig. 26 is a view similar to Fig. 25 showing some of the elements in different positions.

Before describing details of the mechanism herein shown, I will refer to Figures 1 to 4 and briefly point out a few of the elements, and the manner in which they are associated with each other to discharge the targets in numerous directions. However, it is to be understood that these four views are merely simplified diagrams which aid in explaining the general plan of operation, and they are not intended to accurately illustrate any of the details of construction.

Figure 4:
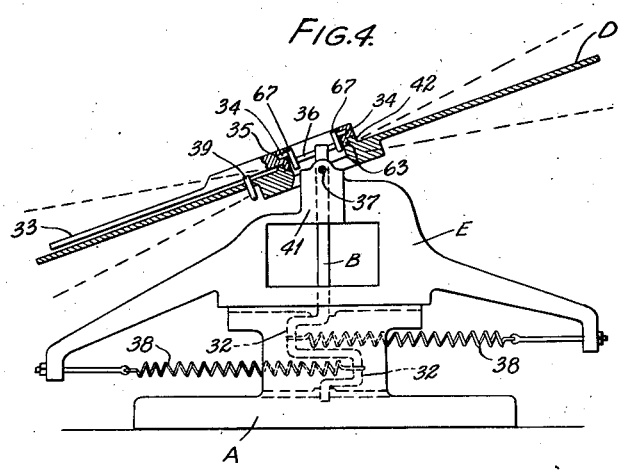
Fig. 4 is a diagrammatical side view, with the target-supporting table shown in section, various details being omitted, and the parts shown being simplified to aid in describing the method of operation.

In Fig. 4, a stationary base A is provided with bearings for a shaft B having oppositely disposed cranks 32. A throwing arm 33 is secured to the upper end of the shaft B, through the medium of a universal joint comprising pivot members 34 extending into the hub 35 of the throwing arm, and a crank pin 36 located in the forked upper end of said shaft B, as shown more clearly in Figures 5 and 20.

Figure 28:
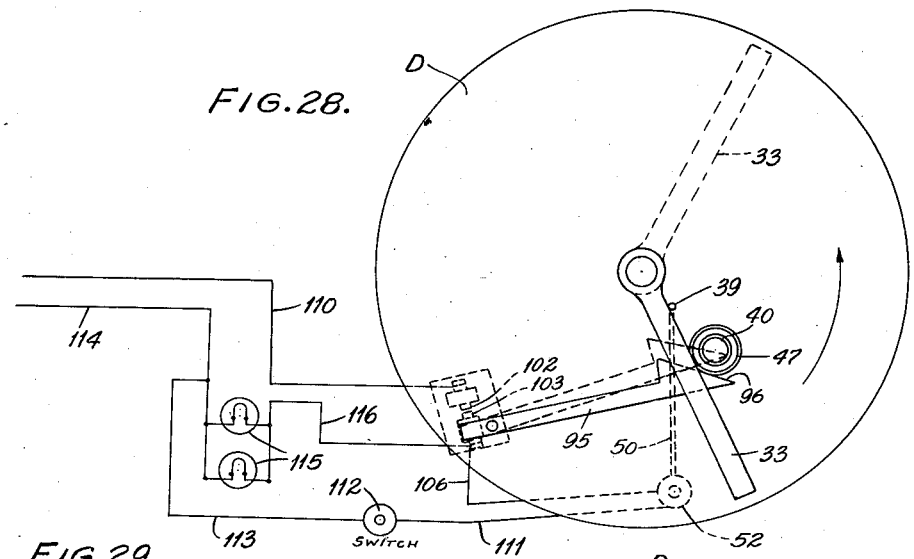
Fig. 28 is a diagrammatical view showing a means for controlling the release of the throwing arm.

Again referring to Figures 1 to 4, the hub 35 of the throwing arm may be rotatably mounted on a target support D, preferably in the form of a circular table, pivoted at 37 to a frame E adapted to oscillate on the stationary base A. A pair of oppositely disposed springs 38 connect the cranks 32 to the oscillatory frame E. A trigger pin 39 extends through the table D, to serve as a stop for the throwing arm 33, and this pin can be moved downwardly to release said throwing arm, whereupon the springs 38 will actuate said arm to sweep a target over the surface of the table D and discharge the target from the periphery of said table. In Figures 10 and 28 I have shown a target 40 located in its starting position at one side of the throwing arm.

To understand the action of the few elements shown diagrammatically in Fig. 4, one should bear in mind that the spring-actuated crank shaft B is at all times connected to the throwing arm 33, through the medium of the universal joint at the upper end of this vertical shaft B. However, the oscillatory frame E is movable independently of this shaft, and is not directly attached to said shaft, although it may oscillate about the axis thereof.

The target support D is pivoted at 37 to the oscillatory frame E, and is not fixed to the crank shaft B. This is shown most clearly in Fig. 20, wherein horizontal pivot pins 37 extend from opposite sides of a bearing 41 on the oscillatory frame, and enter into an annular flange 42 on the target support D. The target-supporting table is, therefore, pivoted to the oscillatory frame E, and its pivot pins 37 do not enter into the crank shaft B.

The target support D is tiltable about the horizontal axis of the pivot pins 37, so as to vary the angle of said target support relative to a horizontal plane. The hub 35 of the throwing arm is rotatably interlocked with the annular flange 42 on the target support, and it will be observed that the universal joint 34, 36, permits the throwing arm to tilt with the target-supporting table.

I will hereafter describe a device whereby the table D and throwing arm 33 are automatically tilted about the axis of the pivot pins 37, to locate these elements at different angles as suggested by dotted lines in Fig. 4.

Each target is discharged in an ascending course, at an unexpected angle to a horizontal plane. This refers to the variations in the "angles of elevation" which are preferably obtained automatically, and not in any regular sequence. The automatic shifter which tilts the throwing arm and table is uncertain or irregular in its selection of the angle of elevation, so the shooters are not advised of the selected angle until they see the target in flight.

The foregoing refers to variations in the angles relative to a horizontal plane, obtained by tilting the throwing arm and target support on the horizontal pivot pins 37 which connect the target support D to the oscillatory frame E. I will now refer to variations in other directions obtained by automatically adjusting said oscillatory frame and target support about the axis of the vertical crank shaft B.

Figure 3:
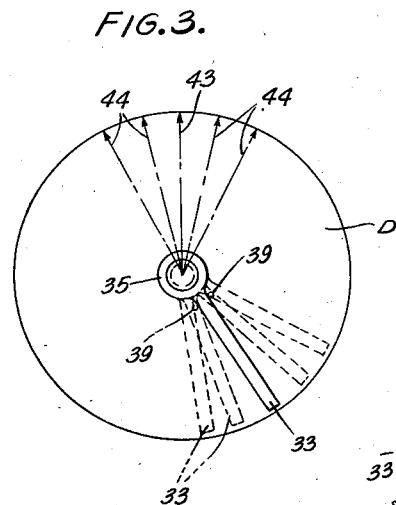

In Fig. 3, I have shown imaginary radial lines 43 and 44 terminating at arrows which indicate some of the various points from which the targets may be discharged from the trap. For example, if the device is set to locate the throwing arm in the starting position shown by full lines in Fig. 3, the target will be discharged from the midway point indicated by the arrow at the end of the radial line 43. By locating the target support D and throwing arm 33 in other starting positions, suggested by dotted lines in Fig. 3, the targets can be discharged from the points indicated by arrows at the ends of the radial lines 44.

Figure 1:
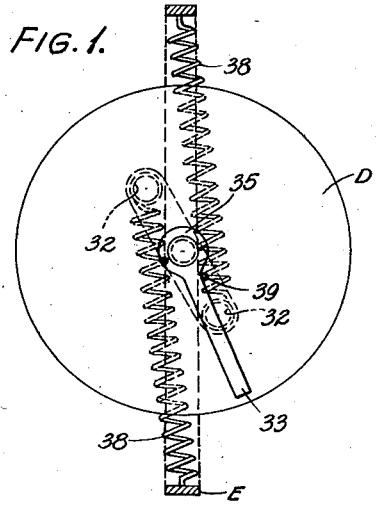
Figures 1, 2 and 3 are diagrammatical top views of a target trap embodying features of this invention, showing the throwing member in different positions.
Figure 2:
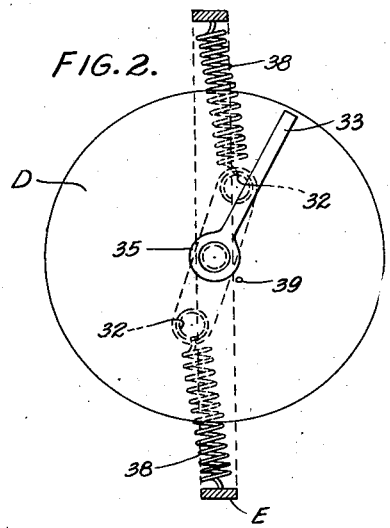

As a preliminary step in pointing out a manner in which such adjustments can be obtained, attention is directed to Fig. 1 which shows the throwing arm 33 in a starting position, where it contacts with the trigger pin 39, the springs 38 being tensioned, and the cranks 32 being beyond their "dead center" positions, so as to force the throwing arm onto the trigger pin. Particular attention is directed to these conditions, as they will enable one to more readily understand details hereafter described. The oscillatory frame E is at all times connected to the target support D through the medium of horizontal pivots 37. The crank shaft B is always connected to the throwing arm through the universal joint. The springs 38 yieldingly connect the oscillatory frame E to the crank shaft.

In setting the trap, the crank shaft is moved in a counter-clockwise direction to tension the springs 38 and locate the throwing arm in its target-receiving position. The oscillatory frame E is movable independently of the crank shaft to locate the target support D and its trigger pin 39 in an automatically selected position.

Attention is again directed to Fig. 1 which shows the cranks 32 beyond their "dead center" positions, and the springs 38 tensioned to force the throwing arm onto the trigger pin 39 in the target support D.

Under these conditions, all of the elements shown in Fig. 1 are rather firmly connected together through the medium of the tensioned springs 38 which connect the crank shaft to the oscillatory frame E. These springs tend to move the crank shaft and its throwing arm in one direction, while tending to move the frame E and its target-support D in the opposite direction.

However, such movement is prevented by engagement of the arm 33 with the trigger pin 39 on the target support. It is then possible to freely move all of the elements in Fig. 1 as a unit, about the axis of the crank shaft, and such movement is an aid in setting the device to various starting positions suggested by dotted lines in Fig. 3. I will hereafter describe an automatic means cooperating with the oscillatory frame E to select one of these starting positions, and to then lock said oscillatory frame, so as to prevent displacement of the target support D during the throwing operation.

It will now be understood that the springs 38 may transmit motion through the crank shaft B and thence to the throwing arm 33, without imparting any motion to either the target support D or its oscillatory frame E.

When the trigger pin 39 is withdrawn from the throwing arm 33, the springs 38 quickly actuate said arm to throw the target, and during this throwing motion, the target rolls along one edge of the throwing arm in response to centrifugal force. At this time, the target support D is preferably stationary, but the target quickly rolls along the arm 33 which sweeps it over the surface of said support, so the target is forcibly projected into the air while rotating at a very high speed due largely to the momentum acquired by the target during its rapid rolling motion on one edge of the long throwing arm.

To obtain this result, I have disclosed a target support provided with chromium plated top face 45 (Fig. 11), forming an extremely smooth and almost frictionless seat for the targets. This detail is quite important as it enables the targets to start easily, without breakage, and to immediately begin their rotary motion, which rapidly increases as the targets freely slide over the smooth chromium plate. The throwing arm moves independently of the target support, and the targets slide a considerable distance on the support, but in actual practice I have found that the chromium surface in this combination affords a complete solution to the problem of minimizing friction that would otherwise retard the targets. The advantages of free starting and rapid rotation have been sought by others in this art, the objects being to forcibly discharge the targets at a high velocity, while they are rotating at a very high speed, without breakage during the throwing operation. The desired results have not been accomplished by the prior devices of which I am aware.

The throwing arm 33 (Figures 10 and 13) is provided with an insert 46 having a straight outer edge which overlies a flange 47 at the base of the target 40, and it will be observed that the arm does not extend beyond the outer edge of the target support D. This feature prevents displacement of the targets as they leave the outer end of the arm. In other words, the targets pass from the arm while their flat bottom faces are seated on the flat surface of the target-support, so the outer end of the moving arm does not in any way interfere with a free discharge of the targets, which are properly delivered, regardless of variations in the thickness of their base flanges.

The target support D is preferably circular, and it has an annular marginal guard 48 (Figures 5 and 10) extending entirely beyond the path of the throwing arm. This circular guard may be formed integral with ribs 49 radiating from the hub portion of the target-supporting table, to form a support for the thin chromium plated disk on which the targets are seated. The smooth circular outer edge of said guard 48 preferably lies beyond the outer edge of the disk, and this provides a safety device to prevent injury to persons who might otherwise be struck by the throwing arm.

The trigger pin 39 (Figures 5 and 6) is slidably mounted in the target-supporting table D, and it normally projects from the top of said table to provide a stop for the throwing arm 33. The means for releasing said throwing arm comprises a lever 50 having an upper end connected to the trigger pin (Fig. 6) and a lower end connected to the core 51 of a solenoid 52, as shown in Fig. 5, said lever being pivoted at 53 to the target-supporting table. The solenoid 52 is secured to said table, and it is energized through the medium of a manually controlled electric switch hereafter described.

The solenoid core 51 is connected to the long arm of the lever 50, and the weight of this core and arm tends to retain the trigger pin in its operative position, but when the solenoid is energized, the core 51 moves upwardly to actuate the lever 50 and thereby move the trigger pin away from the throwing arm.

Figure 23:
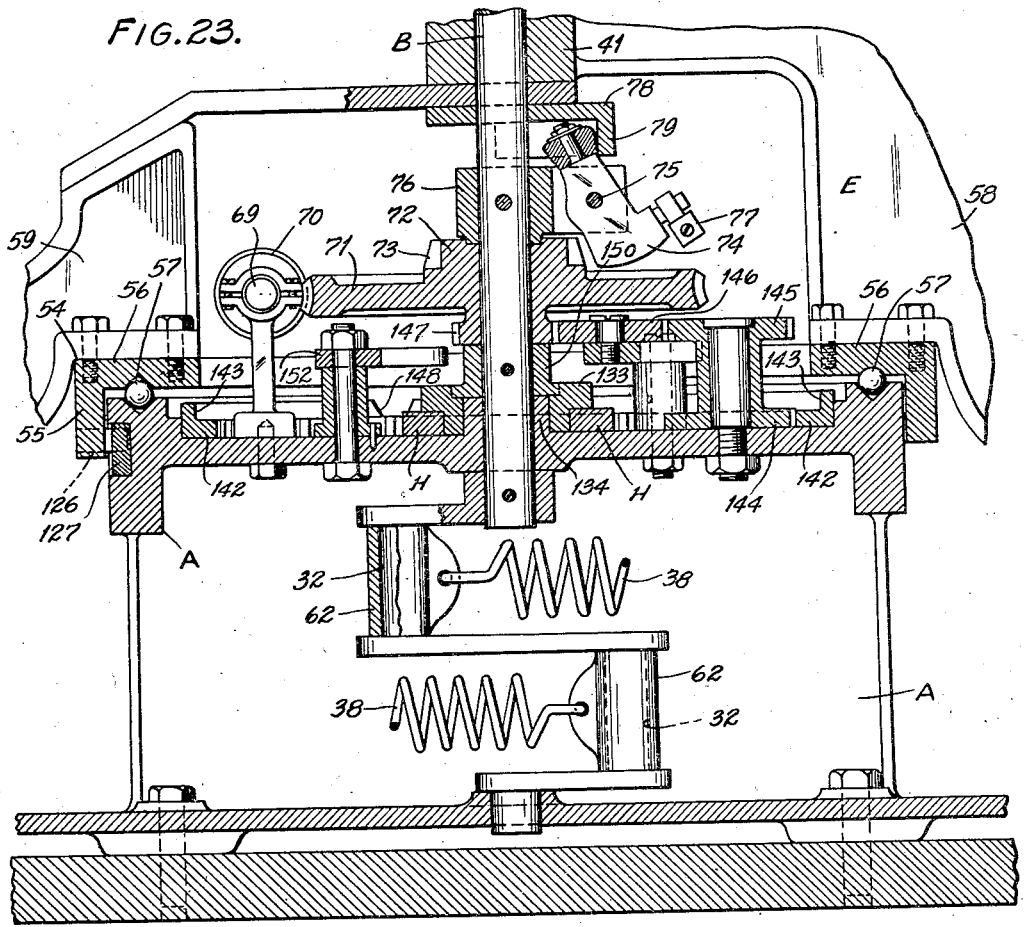
Fig. 23 is a vertical section taken approximately on the line 23—23 in Fig. 25, showing various elements at and near the central portion of the trap, some of the parts being broken away.

I will now describe details of the oscillatory frame E shown in Figures 5, 14, 20 and 23. A circular member 54 is provided with an annular flange 55 surrounding the stationary base member A, and a horizontal inturned flange 56 extending over said base member and resting upon a ball bearing 57 between said flange 56 and the top of the base member. Oppositely disposed arms 58 and 59 are secured to the circular member 54, as shown in Figures 5 and 23, one of said arms having the bearing 41 for the crank shaft B. Each of the arms 58 and 59 (Fig. 5) is provided with a screw 60 to receive one of the throwing springs 38, and a nut 61 on said screw to vary the tension of the spring. The inner ends of the springs 38 are preferably connected to the cranks 32 by means of sleeves 62 loosely surrounding the respective cranks.

Figure 20:
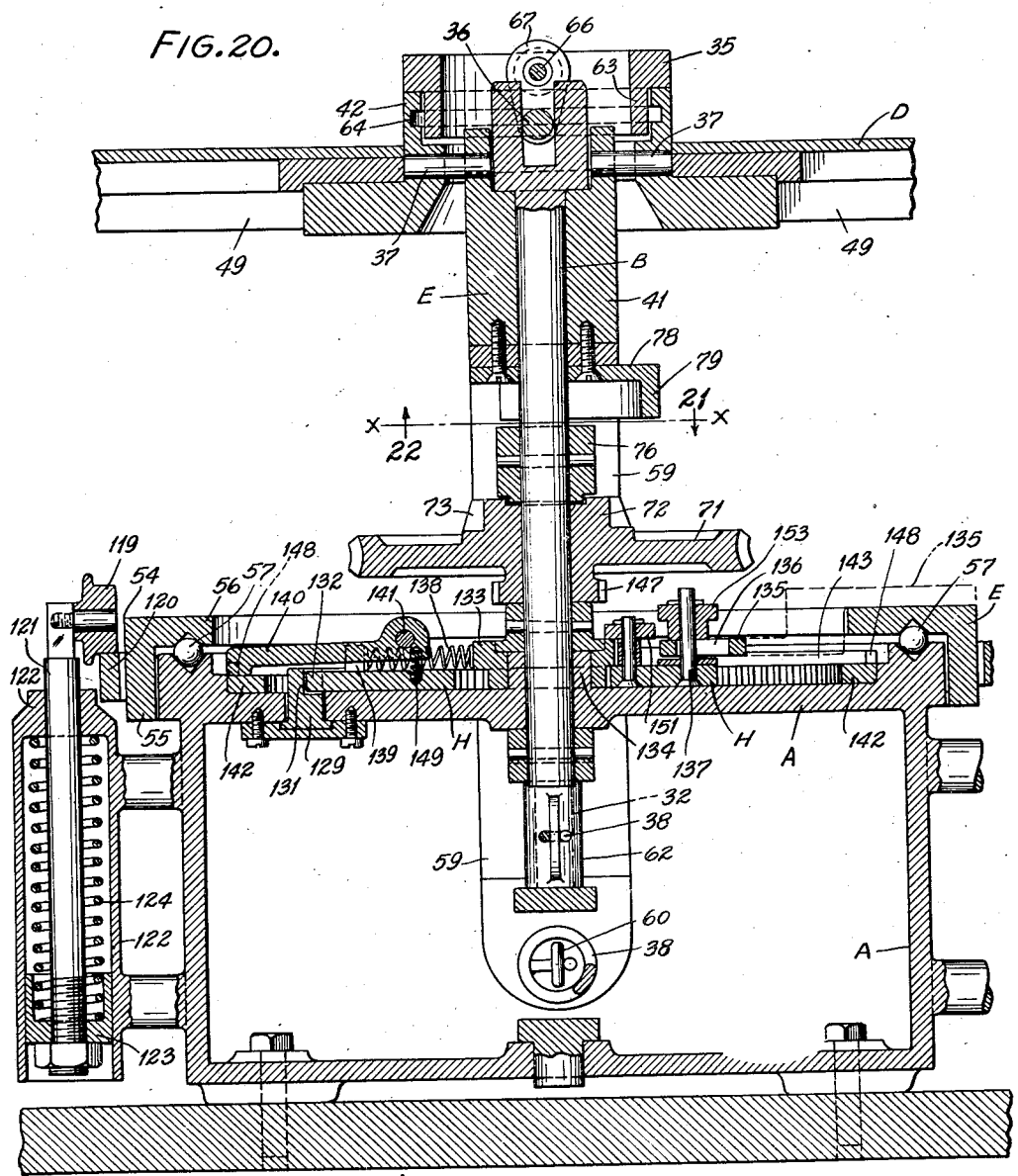
Fig. 20 is a vertical section of the target trap taken approximately on the line 20—20 in Figures 5 and 25, some of the parts beings broken away.

The horizontal pivot pins 37, which connect the target-supporting table D to the oscillatory frame are shown in Figures 5 and 20. This frame is adapted to oscillate on the ball bearing 57, and it is movable independently of the crank shaft.

The means for rotatably securing the throwing arm to the target-supporting table D is shown in Figures 5, 10, 20 and 29. It comprises a flange 63, on the hub of the throwing arm surrounded by the circular flange 42 on the table D, said flange 42 having an annular groove 64 (Fig. 20) to receive projecting portions of short pins 65 carried by the hub 35 of the throwing arm. These short connecting pins appear in Figures 5 and 29, and one of them is shown in Fig. 9. They have reduced projecting portions which extend into the annular groove in the table, so as to rotatably secure the throwing arm to the table, and at the same time permit the arm and table to move independently of each other about the axis of the crank shaft.

The throwing arm is thus interlocked with the target-supporting table, so as to tilt with the table when the latter is adjusted to vary the angle of elevation, and the interlocking means does not interfere with the independent rotative movements of said arm and table.

The universal joint for transmitting movement from the crank shaft B to the throwing arm is shown in Figures 5, 10, 20 and 29. It comprises a pin 66 extending across the hub of the throwing arm to form the pivots 34 for the crank arms 67, said arms being connected at their lower ends by means of the rod 36 located in the forked upper end of the crank shaft B. The throwing arm is thus connected to the crank shaft by means of a universal joint which permits tilting of the throwing arm and target support. It is to be understood that this universal joint does not transmit motion to the target-supporting table D.

The means for transmitting power to the crank shaft B for the purpose of energizing the throwing springs 38, and restoring the throwing arm 33, may be an electric motor, or other suitable source of power. For example, I have shown a constantly running electric motor 68 (Figures 5 and 14) having a shaft 69 provided with a worm 70 meshing with a worm gear 71, the latter being loosely mounted on the vertical crank shaft B, as shown in Fig. 23. This worm gear 71 may be driven continuously, and a suitable clutch device may be employed to transmit motion from said worm gear to the crank shaft B.

Figure 21:
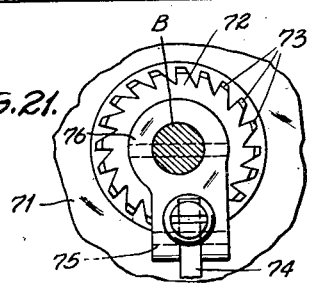
Fig. 21 is a section on the line x—x in Fig. 20, looking downwardly as indicated by the arrow 21, to show a centrifugal clutch device adapted to connect the crank shaft to a source of power.
Figure 22:
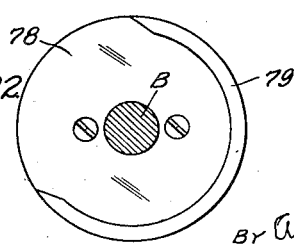
Fig. 22 is a section on the line x—x in Fig. 20, looking upwardly as indicated by the arrow 22, to show a cam for releasing the clutch device.

For example, as shown in Figures 5, 21 and 23, a driving clutch member 72 may be formed by ratchet teeth 73 integral with the constantly rotating worm gear 71, and a driven clutch member may be formed by a dog 74 pivoted at 75 to a collar 76, said collar being fixed to the crank shaft B. The lower portion of this driven clutch member 74 is adapted to engage the constantly rotating ratchet 72. An extension of the driven clutch member 74 is provided with an adjustable weight 77 (Fig. 5) tending to force said clutch member into engagement with the ratchet 72. However, a cam 78 carried by the oscillatory frame E (Figures 5, 20 and 22) is provided with a segmental flange 79 which receives a roller on the pivoted clutch member 74 to normally separate said clutch member from the constantly rotating ratchet 72.

When the throwing arm 33 occupies its target-receiving position, the driven clutch member 74 engages the segmental flange 79, as shown in Fig. 5, and is, therefore, separated from the ratchet 72.

During the target-throwing operation, the springs 38 transmit motion through the crank shaft B to the throwing arm, and since the driven clutch member 74 is carried by a collar 76 on the crank shaft, it is then moved beyond the segmental cam flange 79, and the weight 77 on said clutch member 74 tends to move it into engagement with the constantly rotating ratchet wheel. However, the spring-actuated crank shaft B is driven at a very high speed in throwing the target, and since the clutch member 74 is pivoted at 75 its weighted lower portion will swing outwardly away from the ratchet wheel 72, in response to centrifugal force, during the rapid movements of the crank shaft. When the speed decreases to approximately the speed of the constantly rotating ratchet wheel 72, the clutch member 74 will drop into engagement with said ratchet wheel.

Motion will then be transmitted through the clutch device to the crank shaft B so as to gradually tension the springs 38 while restoring the throwing arm to its target-receiving position. Fig. 1 shows that cranks 32 are slightly beyond a "dead-center" position when the throwing arm occupies its target-receiving position. Immediately after the cranks pass "dead-center", the springs 38 impart a comparatively rapid impulse to the crank shaft and throwing arm, which moves said arm into engagement with the trigger pin 39, and during this final impulse, the driven clutch member 74 travels faster than the ratchet wheel 72. The driven clutch member 74 is then free of the driving pressure, and it engages the segmental cam flange 79 which freely separates said clutch member 74 from the ratchet teeth. The clutch is thus restored to the inoperative condition, shown in Figures 5 and 23, immediately before the throwing arm reaches its target-receiving position.

Attention is now directed to the manner in which centrifugal force is advantageously employed to control this clutch device. The constantly rotating driving clutch member 72 turns at a relatively low speed, while the crank shaft B and throwing arm are very rapidly actuated to throw the target, and immediately after the throwing operation, the shaft and arm rapidly oscillate within limits permitted by the throwing springs. During these very rapid movements, the influence of centrifugal force separates the clutch member 74 from the clutch member 72, but when the speed decreases, the centrifugally controlled clutch member 74 moves into engagement with constantly rotating clutch member 72. This eliminates the severe shocks or strains that would otherwise be caused by engaging the positive clutch members while they are moving in opposite directions, or at considerably different speeds.

I will now refer to a means for varying the strokes of the throwing arm to discharge targets at different velocities. The variation in the speed of the targets is preferably obtained automatically, and it corresponds to one of the uncertainties in the flight of birds.

To illustrate this feature, I have shown a variable stop device carried by the throwing arm and adapted to engage the trigger pin 39 in the target-supporting table, so as to stop the throwing arm in different positions relative to the "dead-center" position of the cranks 32. To briefly explain the effect of the variable stop device, attention is directed to Fig. 1, which shows the cranks 32 beyond "dead-center" and the tensioned springs 38 forcing the throwing arm 33 onto the trigger pin 39. If the throwing arm is stopped in a target-receiving position at either side of the position shown in Fig. 1, the throwing stroke of said arm will be increased or decreased, and the tension of the springs 38 will be accordingly varied to vary the velocity of the targets.

These variations may be obtained through the medium of an automatically adjusted device including a pair of guide member 80 (Fig. 10) rigidly secured to the throwing arm as shown in Fig. 16, and stop members carried by said rigid guide members. A bar 81, slidably mounted between the guide members 80, is adapted to engage the trigger pin 39 as shown in Fig. 15, and this slidable bar has an upturned portion 82 provided with a stop pin 83 shown in Figures 10, 15 and 17. An abutment member 84, in the form of a rotatable cylinder, is provided with recesses 85 of various depths to receive the stop pin 83. This cylinder is shown in Figures 10, 15, 17 and 18. It comprises a head wherein the recesses are formed, and a tubular member 86 extending from said head and rotatably mounted in a bearing 87 (Figures 10 and 15). This bearing may be formed integral with the guide members 80 which are rigidly secured to the throwing arm.

A toothed adjusting wheel 88 is rigidly secured to one end of the tubular member 86, as shown in Fig. 15, for the purpose of imparting motion to the rotatable cylinder 84. A compression spring 89 is located in said tubular member 86 and confined between the wheel 88 and the extension 82 of the slidable bar 81. A spacing sleeving 90 (Fig. 15) is confined between the wheel 88 and the bearing 87. A rod 91 is rigidly secured to the extension 82 of said slidable bar, as shown in Fig. 15, and this rod 91 extends through the spring 89 and the wheel 88, said rod having an extended portion to receive a shock-absorbing spring 92 which lies between the wheel 88 and an adjustable spring seat 93 at the end portion of the rod.

To understand the operation of this stop device, one should remember that the bearing 87 (Figures 10 and 15) is carried by the guides 80 which are rigidly secured to the throwing arm 33 as shown in Fig. 15, and that the stop bar 81 is slidable between said guides.

When the trigger pin 39 (Fig. 15) is released from the slidable stop bar 81, the compression spring 89 immediately moves said stop bar to the right from the position shown in Fig. 15, thereby withdrawing the stop pin 83 from the rotatable cylinder 84. This cylinder can then be turned in its bearing 87 to locate another of its recesses 85 in the path of the stop pin 83. These recesses vary in depth, as shown in Figures 15 and 18, and abutments are formed in different planes, at their inner ends to receive the end face of the stop pin 83. One of said recesses may extend entirely through the cylinder 84, as shown at the middle of Fig. 18 and at the top of Fig. 15, which permits the bearing 87 to serve as a stop for the pin 83. Furthermore, the recesses 85 may be formed as shown in Fig. 17, with relatively wide spaces between some of them, to permit the stop pin 83 to engage an end face of the rotatable cylinder 84 instead of entering into said cylinder.

It will now be understood that when the throwing arm is released from the trigger pin 39, (Fig. 15) the stop pin 83 is withdrawn from the rotatable cylinder 84 through the medium of the spring 89, and that said cylinder 84 can then be turned in the bearing 87 to change the locations of the varying recesses 85 with relation to the stop pin 83.

The means for adjusting this stop cylinder 84 comprises the toothed wheel 88 secured to said cylinder (Fig. 15), and a member 94, preferably in the form of a lug, or tooth, secured to the target-supporting table D as shown in Figures 10 and 11. This tooth 94 lies in the path of the toothed wheel 88 which travels with the throwing arm 33, and during the return of said arm to its target-receiving position, the toothed wheel 88 engages said tooth 94 and turns a fraction of a revolution, so as to impart a corresponding movement to the stop cylinder 84.

In other words, the stop cylinder is rotatable step by step, in response to successive target-throwing operations, to vary the locations of the recesses 85 (Fig. 18), thereby varying the target-receiving positions of the throwing arm. The strokes of said arm and the tension of the throwing springs 38, are therefore automatically adjusted, to discharge the targets at different velocities.

The compression spring 89 (Fig. 15) serves as means for withdrawing the stop pin 83 from the cylinder 84, and also gradually absorbs the shocks which occur when the slidable stop member 81 strikes the trigger pin 39. The small spring 92 on the rod 91 serves as a shock absorber when the trigger pin 39 is released from the slidable stop bar 81, at which time, the spring 89 quickly throws said stop bar to the right from the position shown in Fig. 15.

These springs oppose each other and tend to move the slidable bar 81 in opposite directions, but the main function of the spring 92 is to provide a yielding stop for the slidable bar and elements carried thereby when they are thrown from the position shown in Fig. 15.

Attention is now directed to a target-stop 95 (Fig. 10) associated with the target support D to vary the starting positions of the targets. This device enables the targets to be properly positioned at different distances from the axis of the throwing arm.

To illustrate a simple form of the target stop 95 I have shown an arm having a target-receiving abutment 96 (Fig. 10) at an obtuse angle to a radial line drawn from the axis of the throwing arm. The means for securing said stop to the target-supporting table includes a screw 97 (Fig. 10) and other elements hereafter described. For the present, it will be merely noted that the stop 95 is secured to the target support D, and not to the throwing arm.

When the target 40 occupies its starting position it contacts with the throwing arm 33 and inclined face 96, as shown in Fig. 10, and it can be readily seated against these elements, which cooperate with each other to definitely fix the starting point of the target.

One of the advantages of this target stop lies in the manner in which it cooperates with the throwing arm to vary the starting positions of the targets. For example, if the stroke of the throwing arm is varied, as herein described, to discharge the targets at different velocities, said arm will be stopped in different positions relative to the inclined target seat 96. More specifically stated, when the throwing arm is set for a relatively long stroke, it will occupy a position to the left of that shown in Fig. 10, and a target seated against said arm and the inclined seat 96 will then lie relatively close to the axis of the throwing arm. The starting position of the target is varied in accordance with variations in the stroke of the throwing arm, and the target stop 95 is so formed that the target will lie relatively close to said axis when the arm is set for a long stroke and more remote from the axis when said arm is set for a shorter stroke.

As a consequence, the travel of the targets along the throwing arm can be determined by the throwing stroke of the arm, and all of the targets can be discharged from the same point on the table D, regardless of variations in said stroke. It is to be understood that the table D can be adjusted in a circular course to discharge the targets in different directions, but all of the targets may be discharged from the same portion of the adjustable table. In other words, the throwing arm is stopped in different target-receiving positions to vary the velocities of the targets, but the angular target seat 96 (Fig. 10) is preferably so arranged that all of the targets are properly discharged from the throwing arm at a predetermined point in the discharge stroke of said arm.

However, it is to be understood that other advantages can be obtained by a target stop of this kind, adapted to vary the starting positions of the targets, either with or without a variation in the stroke of the throwing arm.

One of the objects of the invention is to prevent accidental, or unintentional operation of a target-throwing device when there is no target in the trap. As a specific illustration of this feature I will disclose a device controlled by the target to prevent release of the throwing member until a target is positioned in the trap.

Briefly stated, this result may be accomplished by the target-receiving member 95 (Figures 10 and 28) and a switch actuated thereby to control the transmission of current to the solenoid 52 shown in Figures 5 and 28. The solenoid is energized to release the trigger pin, and the target-controlled switch may be in the solenoid circuit.

Figures 30, 31:
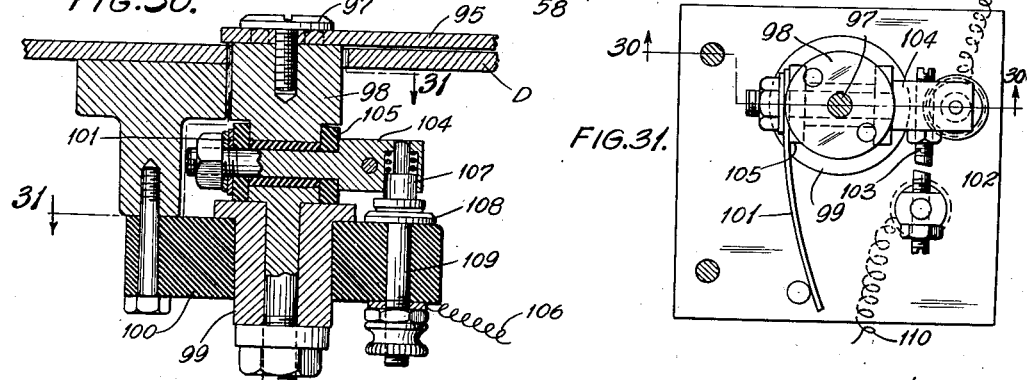
Fig. 30 is a detail view of electrical connections, taken approximately on the line 30—30 in Fig. 31.
Fig. 31 is a section taken approximately on the irregular line 31—31 in Fig. 30.

Details of this device appear in Figures 10, 30 and 31, and also in Fig. 28 which is a diagrammatical view showing the electric circuit. The screw 97 (Figures 10 and 30) secures the target-receiving arm 95 to a pivot formed by a member 98 which extends through the table D, and a lower pivot member 99 secured to the member 98, as shown in Fig. 30. The lower member 99 is pivotally supported in a block of insulation 100, to form a pivotal mounting for the target-receiving member 95. A leaf spring 101, secured to this pivot device, (Figures 10 and 31) tends to move the target-receiving member 95 in one direction, and the target itself is employed to move said member 95 in the opposite direction. For example, when there is no target in the trap, the member 95 may be yieldably held in the position shown by dotted lines in Fig. 28, when the target is properly delivered to the trap, it will locate said member 95 in the position shown by full lines.

The switch controlled by the target-receiving member 95 comprises a stationary contact member 102 (Figures 28 and 31) and a movable contact member 103 carried by the pivotal mounting 98, 99, so as to move in response to movements of the target-receiving member 95. Details of this switch shown in Figures 30 and 31 include an arm 104 secured to but insulated from the pivot member 98, the insulation being shown at 105 in Fig. 30. The movable contact member 103 is screwed into the arm 104 and electrically connected to a wire 106 through the medium of a spring-pressed contact member 107 (Fig. 30) frictionally engaging the head 108 of a bolt 109 to which the wire 106 is connected. The pivotal movement of the member 103 is relatively slight, and the wire 106 is at all times electrically connected to the movable contact member 103, as suggested in Fig. 28. Another wire 110 is connected to the stationary contact member 102, as shown in Figures 28 and 31.

The electric circuit (Fig. 28) includes the feed wire 110 connected to the stationary contact member 102, the wire 106 connecting the movable contact member 103 to the solenoid 52, a wire 111 extending from the solenoid to a manually operated switch 112, and a wire 113 connecting said switch to the return conductor 114. All of these elements are connected in series with each other.

To energize the solenoid, current must flow through the manually operated switch 112 and also through the contact members 102 and 103. Therefore, the solenoid cannot be energized to release the throwing arm unless the current is transmitted through the target-controlled switch formed by the contact members 102 and 103, and this switch occupies its open position when there is no target in the trap. It is not closed until the target is properly located on the inclined seat 96, and this requires a movement of said seat from the position shown by dotted lines in Fig. 28 to the position shown by full lines. Thereafter, the weight of the target and its frictional engagement with the surface of the table D will retain the target-controlled switch 102 and 103 in its closed position. The manually controlled switch 112 can then be operated to release the throwing arm.

This feature eliminates, or minimizes, injuries that may occur from accidental operation of the trap, and it tends to insure a proper location of the target in the desired starting position.

I have also disclosed a signal device to indicate the presence of a target in the trap. As an illustration of a suitable signal, or indicating device, I have shown electric lamps 115 (Fig. 28) connnected to the target-controlled switch 102, 103, each of said lamps having one of its terminals connected to a wire 116 leading to the contact member 103, and its other terminal connected to the return wire 114. When a target is properly located in the trap, the lamps 115 will be energized through the target-controlled switch.

One of the signal lamps may be exposed to the operator in the trap house, while the other is located within the view of the shooters, or contestants, so as to notify or remind all of these persons of the presence of a target in the trap, at the same time indicating that the trap is set to discharge the target.

When the throwing arm is released, the target leaves the lever arm 95, and the latter moves to the position shown by full lines in Fig. 28, thereby opening the target-controlled switch 102 and 103, to extinguish the signal lamps 115, and prevent accidental operation of the trigger pin until the trap is reset and another target properly positioned at the throwing arm.

I will now describe details of the means for adjusting the oscillatory frame E whereby the target-supporting table D is moved about the axis of the crank shaft B, to provide for a discharge of targets in different directions.

Cam tracks 120 (Figures 5, 14 and 20) are secured to opposite sides of the circular member 54 which forms part of the oscillatory frame E. Rollers 119 engage the top faces of the respective tracks 120, each of said rollers being secured to a vertical rod 121 (Fig. 20) slidably fitted to the top of a cylinder 122 and provided with a spring seat 123 located within and guided by the cylinder, a spring 124 being interposed between the seat 123 and the top wall of the cylinder. The rollers 119 are thus forced downwardly on the inclined top faces of the tracks 120, and since these tracks are rigidly secured to the oscillatory frame E, it will be understood that the springs 124 may cooperate with the rollers 119 and tracks 120 to turn the target-receiving table in one direction.

Movement in the opposite direction may be transmitted from the cranks 32 which are connected to the oscillatory frame E through the medium of the throwing springs 38. When the cranks 32 are driven by the motor to tension the springs 38 and restore the throwing arm, the pulling action exerted on the springs tends to turn the oscillatory frame, and at this time the power transmitted through the springs is great enough to overcome the downward pressure of the rollers 119 on the inclined tracks 120, which tends to turn said oscillatory frame in the opposite direction.

Under some conditions, the pulling force transmitted through the springs 38 will move the frame E to an extreme position in one direction, and when this occurs, the abrupt inclines 125 at the upper ends of the tracks will pass under the spring-pressed rollers 119, so as to gradually retard and then stop the oscillatory frame. Thereafter, the cranks 32 will continue their rotary motion until they pass over deadcenter, to engage the throwing arm with the trigger pin 39, as shown diagrammatically in Fig. 1. At this time, the pulling effect of the springs is neutralized by a tendency to turn the oscillatory frame and throwing arm in opposite directions, such movements being then prevented by the trigger pin 39 carried by the table D on the oscillatory frame. Since the springs 38 merely force the throwing arm onto the trigger pin, it will be apparent that the table D, frame E, throwing arm 32, crank shaft B and springs 38 are so united that all of these elements may be freely turned as a unit, about the axis of the crank shaft, regardless of the tension of the springs 38.

Therefore, when the last mentioned condition exists, the rollers 119 pressing downwardly on the inclined tracks 120 will reverse the movement of the oscillatory frame E and its table D, and this reverse movement may be continued until stopped by the abrupt inclines 125 extending upwardly from the lower ends of the tracks 120.

The foregoing refers to extreme positions of the oscillatory frame E resulting from a pulling action of the springs 38 in one direction, and the pressure of the rollers 119 on the tracks 120 tending to turn said frame in the opposite direction. In the ordinary operation of the trap, an automatic stop device to be presently described, stops the oscillatory frame and locks it in an uncertain position between said extremes.

Figure 24:
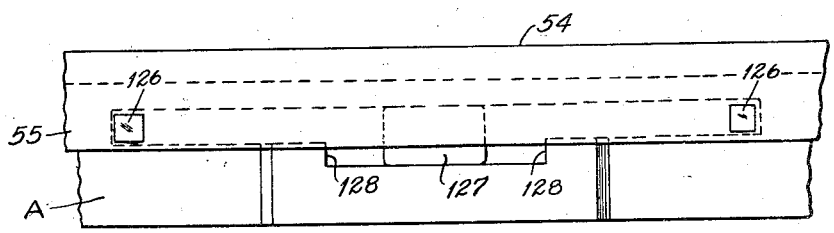
Fig. 24 is a detail view showing a device for positively stopping the oscillatory frame in its extreme positions.

However, as a precaution, to positively prevent excessive movement in either direction, I have shown a safety stop device comprising stop members 126 (Figures 23, 24 and 25) carried by the oscillatory frame and adapted to engage a stop member 127 in the stationary base. The stop member 127 may be loosely confined between shoulders 128 in the stationary base, as shown in Fig. 24, whenever the mechanical conditions render it desirable to locate the stop members 126 relatively close to each other.

The means for automatically stopping the oscillatory frame at various points between its extreme positions comprises a segmental stop bar 129 (Figures 20, 23 and 25) loosely mounted between shock-absorbing springs 130 in the stationary base. This stop bar is practically stationary, its movements being very slight to merely permit the springs 130 to perform the functions, and it has a series of slots, or notches, 131 and 131ᵃ forming abutments for a locking tooth 132, which may enter any of said notches. The locking tooth 132 is formed on a frame H surrounding the crank shaft B and slidably fitted to a guide block 133, shown in Figures 20, 23 and 25. This guide block 133 is pivotally supported around a boss 134 formed on the stationary base, so it can be moved around the axis of the crank shaft. An arm 135 is rigidly secured to the circular member 54 of the large oscillatory frame, as shown in Fig. 25, and this arm has a slot 136 to receive a pin 137 carried by the slidable member H. Said slidable member is thus connected to the large oscillatory frame, so as to oscillate therewith, and whenever the tooth 132 lies in one of the notches 131 in the approximately stationary bar 129, the oscillatory frame will be positively locked.

Figure 25 shows that the slidable frame H is guided partly by the pin 137 in the slotted connecting arm 135, and partly by the rectangular block 133. Springs 138 (Figures 20 and 25) are located between the guide block 133 and lugs 139 on the slidable frame H, so as to yieldingly force said frame and its locking tooth 132 toward the approximately stationary stop bar 129.

Figure 27:
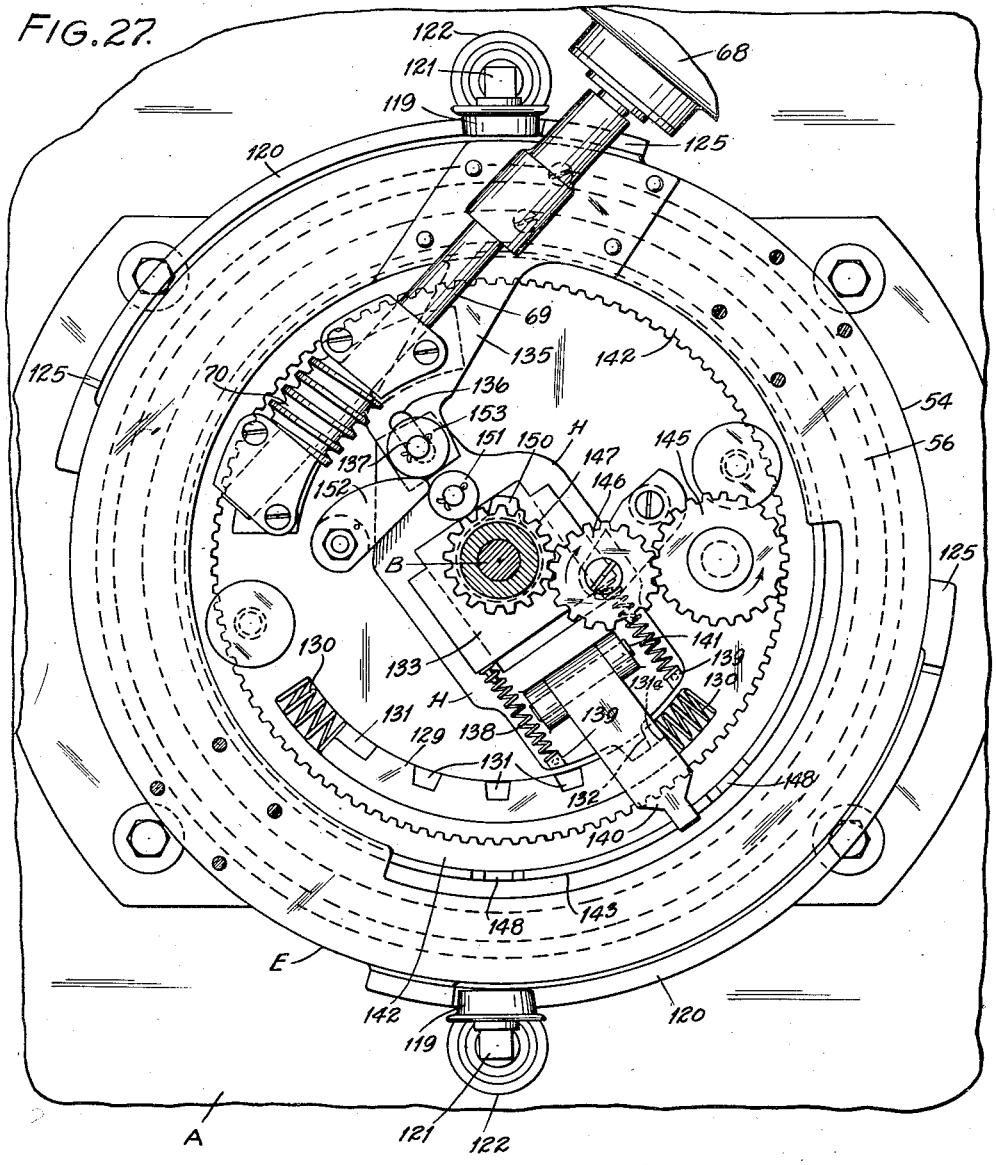
Fig. 27 is a similar view showing other positions of said elements.

The means for selecting the notch 131 or 131ᵃ that is to receive the locking tooth 132 comprises a number of different elements including a feeler 140 pivoted to the slidable frame H, as shown at 141 in Figures 20 and 25, and a constantly rotating gear ring 142 having an upturned flange 143, which cooperates with the free end of said feeler. The means for rotating the gear ring 142 comprises a gear wheel 144 meshing with the teeth on said gear ring (Figures 23 and 25), a higher gear wheel 145 (Figures 23 and 27) integral with the gear 144, an intermediate wheel 146 meshing with the gear 145, and a driving gear 147 integral with the constantly rotating worm gear 71.

The upturned flange 143 on the constantly rotating gear ring 142 is notched, as shown at 148 in Figures 20 and 25, to receive the free end of the feeler. A spring 149 (Fig. 20) retains the feeler in contact with the ring 142.

The operation of the selective stopping device will be briefly described as follows:

When the trap is set to throw a target, the locking tooth 132 lies in one of the notches 131 or 131ᵃ to lock the oscillatory frame E that carries the table D, and at this time the free end of the pivoted feeler 140 extends over and engages the top of the upturned flange 143. However, the notches 148 in this flange have beveled side walls, as shown near the middle of Fig. 23, so the gear ring 142 will then freely rotate, without displacing the locking tooth 132.

When the throwing arm is released, the spring-actuated crank shaft B is turned to quickly actuate said arm, and immediately after the target is discharged from the trap, a cam 150 on said shaft engages a roller 151 on the slidable frame H, as indicated by dotted lines in Fig. 26, thereby withdrawing the locking tooth 132 and locating the end of the feeler 140 at a point inside of the notched flange 143. After said cam 150 passes from the roller 151, the springs 138 will force the feeler onto the inner face of the flange 143, as shown in Fig. 26. The feeler then cooperates with said flange 143 to separate the locking tooth 132 from the stop bar 129.

The large oscillatory frame E is thus unlocked after the target is thrown. It may be carried to one of its extreme positions in response to the pulling action on the throwing springs 38, as previously described, and then moved in the opposite direction in response to the pressure of the rollers 119 on the inclined tracks 120. However, such movements of the oscillatory frame are transmitted from the connecting arm 135 (Fig. 26) to the slidable frame H which carries the feeler along the inner face of the notched flange 143, and whenever the feeler registers with one of the notches 148, the springs 138 (Figures 25 and 26) will force the locking tooth 132 onto the approximately stationary stop bar 129. Consequently, the large oscillatory frame and its target support D may be stopped and locked at various points in their arcute paths.

The gear ring 142 and its notched flange 143 are rotated continuously in only one direction. The feeler travels in this direction, but at a different speed, when the large oscillatory frame is driven by the pulling action on the throwing springs 38, and if the movement of said oscillatory frame is eventually reversed, the feeler will, of course, travel in a direction opposite to that of the notched flange 143.

These movements insure the locking of the large oscillatory frame at some uncertain point in the path of its movements, and in actual practice, I found that at comparatively frequent intervals, the locking tooth 132 would enter the notch 131ª near the right hand end of the stop bar 129 (Fig. 27) while the oscillatory frame is nearing the limit of its movement in a counter-clockwise direction. I have, therefore, provided a stationary cam 152 (Fig. 27) adapted to be engaged by a roller 153 on the pin 137 carried by the slidable frame H, the object being to withdraw the locking tooth 132 and position the feeler against the inner face of the flange 143 whenever said tooth enters the above mentioned notch 131ª during said counter-clockwise movement. This withdrawal will not prevent the locking tooth from entering said notch during the reverse movement of the oscillatory frame, if the feeler 140 registers with a notch 148 during the first part of said reverse movement.

The oscillatory frame E may be termed a "floating carrier" for the target support. It enables said target support to be locked, released and moved back and forth to uncertain positions wherein it is stopped to vary the directions in which the targets are discharged from the trap. All of the targets may be discharged from the same point on the target-supporting table, but by varying the positions of the table, the targets will be thrown in different directions.

Figure 29:
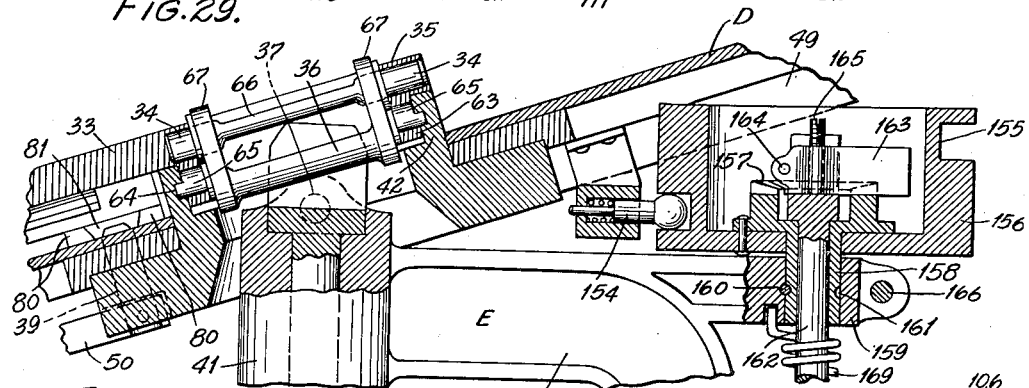
Fig. 29 is a fragmentary section illustrating portions of the automatic means for tilting the target support and throwing arm.

The target support and throwing arm 33 are also tiltable about the axis of horizontal pivots 37 (Figures 4 and 20) as previously pointed out, and I will now describe details of a suitable means for tilting these elements. In Fig. 5 and Fig. 29, the target-supporting table is provided with a spring-pressed rod 154 having a spherical end located in the groove 155 of a cam 156. A ratchet wheel 157, fixed to the cam 156 is provided with a tubular extension 158 rotatably mounted in a bearing 159 carried by the large oscillatory frame E. A pin 160 extends into an annular groove 161 in the tubular member 158 to secure the cam to said bearing. An operating shaft 162 is loosely mounted in the tubular member 158 and provided, at its upper end, with a pawl 163 adapted to engage the ratchet 157. The pawl is pivoted at 164 and provided with a screw 165 which may be adjusted to locate the pawl in an inoperative position above the teeth of the ratchet wheel 157. This adjustment is made on occasions when the persons using the trap desire to avoid the variations resulting from tilting movements of the target support. In this event, a screw 166 (Figures 5 and 29) is tightened to clamp the split bearing 159 onto the tubular member 158.

An arm 167 (Fig. 5), secured to the lower end of the shaft 162, is adapted to engage a stationary abutment 168. A spring 169 surrounding the shaft 162 (Figure 5 and 29) has its lower end secured to the shaft and its upper end anchored to the bearing 159. This spring tends to force the arm 167 toward a stop pin 170, as shown in Figures 5 and 7.

The cam 156, ratchet 157, shaft 162 and stop pin 170 are all carried by the large oscillatory frame E, and during the latter part of the initial movement of said frame, the arm 167 strikes the stationary abutment 168, with the result of imparting rotary movement to the shaft 162 and pawl 163 (Figures 7 and 29). The pawl then cooperates with the ratchet 157 to turn the cam 156 which tilts the target supporting table.

During any reverse movement of the oscillatory frame, the spring 169 reverses the movement of the shaft 162, and the pawl 163 then moves idly over the teeth of the ratchet wheel 157, without imparting movement to the cam 156. It is to be understood that the cam 156 progresses in only one direction, but the degree of its movement is uncertain, and it changes the angle of the tiltable target support in response to movements of the oscillatory frame E. However, the invention is not limited to the details of this specific means for varying the angles of the target support and throwing arm.

The sequence of operations may be summarized as follows:

When the throwing arm occupies its target-receiving position it is restrained by the trigger pin 39. The target is placed on the target support and engaged with the throwing arm 33 and target-stop 95, the latter being moved by the target to close the master switch formed by the contact members 102 and 103 (Figures 31 and 28). The signal lamps 115 are then energized to show that the trap is set and that a target is properly located therein. If the target-stop is not properly positioned, said master switch will occupy its open position, and in this event, current cannot be transmitted to the signal lamps 115, nor to the solenoid 52.

Assuming that the target is properly located in the trap, the master switch formed by said contact members 102 and 103 will then be closed, and the manually operated switch 112 may be actuated to energize the solenoid 52, with the result of moving the trigger pin 39 to release the throwing arm. However, the manually operated switch 112 is ineffective until the target is positioned to close the master switch which energizes the signal lamps, and this tends to prevent accidental, or unintentional, release of the throwing arm.

After the target is discharged from the throwing arm, the cam 150 on the crank shaft B will engage the roller 151 on the slidable frame H (Fig. 26) to release the locking tooth 132 from the approximately stationary abutment bar 129. This unlocks the oscillatory frame E and permits it to float around the axis of the crank shaft until the feeler 140 enters one of the notches 148 in the flange 143 of the constantly rotating gear ring 142. When this occurs, the compression springs 138 will force the locking tooth onto the inner edge of the approximately stationary bar 129, and then into one of the slots 131 or 131a in said bar, so as to again lock the oscillatory frame E. The free end of the pivotally mounted feeler then overlies the constantly rotating flange 143, and since the side walls of the notches 148 in said flange are beveled, as shown near the middle of Fig. 23, the pivoted feeler will idly fall into and rise out of said notches 148 when the locking tooth 132 is interlocked with the approximately stationary bar 129.

This locking operation may occur at various points in the course of the locking tooth 132 carried by the oscillatory frame E, and since the target support D oscillates with said frame, it will be understood that said support may be stopped in various target-receiving positions to provide for a discharge of the target in an unexpected direction.

In addition to its uncertain oscillatory movements about the vertical axis of the crank shaft B, the target-support D is tiltable about the horizontal axis of the pivot 37. The tilting movements are derived from the cam 156 (Fig. 5) surrounding the shaft 162 which has an operating arm 167 at its lower end adapted to engage the stationary abutment 170, said shaft 162 being carried by the oscillatory frame.

The oscillatory movements of this frame are due partly to the rollers 119 pressing downwardly on the inclined tracks 120 carried by said frame, so as to tend to turn said frame in one direction, and partly to the pulling action exerted by the throwing springs 38 which tends to turn said frame in the opposite direction during the operation of tensioning said springs 38. The oscillatory frame E is free to move about the vertical axis of the crank shaft B until locked by a cooperation of the tooth 132 with the approximately stationary bar 129.

The rotary motion of the crank shaft is due partly to the throwing springs 38 which transmit motion to said crank shaft during the throwing operation, and partly to the constantly rotating clutch member 72 (Fig. 23) which transmits power through the clutch dog 74 in tensioning the springs and restoring the throwing arm. The constantly rotating clutch member 72 is driven at a relatively low speed, while the clutch dog 74 is carried by the crank shaft, so as to occupy an inoperative position in response to centrifugal force, during the rapid movements of the spring-actuated crank shaft, and thereafter drop into engagement with the driving clutch member 72 in response to a substantial decrease in the speed of the crank shaft. These positive clutch members 72 and 74 then transmit motion to the crank shaft B and throwing arm 33, until the cranks 32 pass over dead center. The segmental cam flange 79 (Figures 5 and 23) then cooperates with the clutch dog 74 to release it from the constantly rotating clutch member.

Variations in the velocity of the targets are preferably obtained by stopping the throwing arm in different target-receiving positions, thereby varying the throwing strokes of said arm and also varying the effective tension of the throwing springs 38. The means for automatically accomplishing this result includes the stop bar 81 slidably secured to the throwing arm, as previously described, and adapted to engage the trigger pin 39 (Fig. 15). This slidable device is provided with a stop-pin 83 adapted to enter recesses 85 of varying depths formed in the periphery of the rotatable stop cylinder 84, the latter being turned through the medium of the toothed wheel 88 which travels over and engages a lug, or tooth, 94 (Figures 10 and 11) on the surface of the target-supporting table.

On some occasions, one may desire to discharge the targets at a uniform velocity. In this event, the lug, or tooth, 94 is removed from the target-supporting table to prevent automatic adjustment of the stop cylinder 84, which may then be adjusted by hand to provide the desired velocity. It will also be remembered that the means for automatically tilting the target-supporting table D can be rendered inoperative by preventing the transmission of movement to the cam 156 (Fig. 29), and clamping said cam to the split bearing 159, after the cam is adjusted by hand for the desired angle of elevation. The flexibility which enables such adjustments to be obtained automatically, or manually, and independently of each other, at the will of the operator, provides a variety of conditions quite desirable in the service of a target trap.

Variations in the starting positions of the targets are due partly to the target-stop 95 (Fig. 10) having an inclined target seat 96 whereby the targets are readily located in the desired starting positions at different distances from the axis of the throwing arm. This varies the travel of the targets along one edge of the throwing arm, and if the target seat 96 is inclined as herein shown, it will serve as a compensating member to provide for a discharge of the targets at a predetermined point on the target-support D, regardless of variations in the throwing strokes of the throwing arm.

To illustrate one form of the invention, I have shown numerous details of construction which may be readily modified by those skilled in the art, without in any way departing from the invention, and it will also be understood that advantages of novel features herein disclosed can be obtained independently of each other. Nevertheless the cooperation of these features leads to important advantages not obtainable from any one alone, nor from independent use thereof. For example, using simple numbers as an illustration, if the target-support D is tiltable to ten different positions for the purpose of varying the "angles of elevation", and also adjustable to ten different target-receiving positions around the axis of the crank shaft, it may appear that the targets can be discharged in only twenty different directions, as that is the sum of the two adjustments.

However, when the cooperative relationship is established, it will be observed that for each of the ten angles of elevation, there are ten positions of the target support around the axis of the crank shaft. Consequently, the targets may be discharged in one hundred different directions, due to the cooperation of elements which, when used independently, would provide a total of only twenty directions.

Further advantages are gained by varying the velocities of the targets, and this cooperates with the means for varying the directions of discharge, so as to throw each target at an unexpected velocity in an unexpected direction. These conditions, produced by a target trap, correspond to the unexpected flight of live birds, which suddenly arise and fly in directions and at speeds that cannot be predetermined.

Therefore, the novel result obtained by cooperation of the several automatic adjustments herein disclosed is very desirable for a novice, practicing to gain experience in shooting under conditions similar to those found in actual hunting. The result derived from these cooperative adjustments also adds to the entertainment in shooting contests, and it affords a highly satisfactory basis for accurately determining the skill of the contestants.

Actual use of the trap has demonstrated its feasibility, not only in automatically varying the directions and velocities of the targets, but also in the efficiency and durability of the novel mechanical features, which prevent the delivery of excessive shocks to either the targets or the mechanism, and provide for a proper discharge of the rapidly rotating targets.

I claim:

1. A target trap provided with a throwing arm to discharge the targets, operating means for energizing said throwing arm, and a shifting device whereby said throwing arm is tilted to vary its angle of elevation, said shifting device including a driven member actuated by said operating means.

2. A target trap comprising a throwing arm to discharge the targets, a source of power to energize said throwing arm, and a shifting device whereby said throwing arm is tilted to vary its angle of elevation, said shifting device being provided with an operating member driven by said source of power, and a device through which motion is transmitted from said operating member to vary the angle of said throwing arm.

3. A target trap provided with a tiltable throwing arm to discharge the target, and means for automatically varying the angle of elevation of said throwing arm to vary the angle of discharge of the targets, said means including a rotatable member, and a transmission device through which motion is transmitted from said rotatable member to said throwing arm, so as to tilt said throwing arm in response to the rotation of said rotatable member.

4. A target trap provided with a throwing arm to discharge the target, and means for varying the angle of elevation of said throwing arm so as to vary the angle of discharge of the targets, said means including a movable member having a cam face, and a driven member contacting with said cam face and operatively connected to said throwing arm.

5. A target trap provided with a throwing arm to discharge the target, a spring-actuated shaft, a pivot connecting said arm to said shaft, said throwing arm being movable upwardly and downwardly about the axis of said pivot to vary the angle of said arm with respect to said shaft, and a shifting device cooperating with said arm to unexpectedly determine said angle.

6. A target trap comprising a tiltable target support, an automatic shifter for varying the angle of elevation of said target support, a throwing arm movable in an arcuate course independently of the target support to discharge a target therefrom, a spring-actuated power shaft, and a universal joint operatively connecting said throwing arm to said power shaft to permit said throwing arm to tilt with said target support.

7. A target trap provided with a tiltable target support, a throwing arm tiltable with said target support, said tiltable target support being movable in an arcuate course around the axis of said throwing arm to vary the angle of discharge of the targets, and a shifting device for varying the angle of elevation of said tiltable target support, said shifting device comprising a rotatable member having a cam face, an abutment member operatively connected to said target support and in engagement with said cam face, and an operating member actuated during the movement of the target support in said arcuate course, to provide for the transmission of motion to said rotatable member.

8. A target trap provided with a throwing arm to discharge the target, a tiltable target support immediately below said throwing arm, said throwing arm being pivotally interlocked with said target support to permit said arm to move in an arcuate course independently of said support and at the same time prevent upward and downward displacement of said arm relative to said support, a spring-actuated power shaft, a universal joint operatively connecting said throwing arm to said power shaft to permit said throwing arm to tilt with said target support, and a shifting device for varying the angle of elevation of said tiltable target support, said shifting device comprising a rotatable member provided with a cam slot, a spring-pressed abutment secured to said target support and extending into said cam slot, said rotatable member being provided with ratchet teeth, a pawl associated with said ratchet teeth, and means whereby motion is transmitted through said pawl to said rotatable member, said means including a stationary abutment member, and a shaft secured to said pawl and having a lateral arm adapted to strike said stationary abutment member.

9. A target trap comprising a target-support movable in an arcuate course to different target-receiving positions, a throwing arm movable over said target-support to discharge the target therefrom, and means for stopping said support at said target-receiving positions, said means including a series of stops, a locking member adapted to interlock with the respective stops, and an automatic selecting device cooperating with said locking member to vary the target-receiving positions of said support.

10. A target trap comprising a target-support movable in an arcuate course to different target-receiving positions, a throwing arm movable over said target support to discharge the target from said support, and an automatic device for stopping said support at said target-receiving positions, said automatic device including a stop member, and a feeler cooperating with said stop member to selectively determine the target-receiving position of said support.

11. A target trap comprising a target-support movable in an arcuate course to different target-receiving positions, a throwing arm movable over said target support to discharge the target from said support, and means for stopping said support in said target-receiving positions, said means including a locking device for securing said target-support in said target-receiving positions, a feeler for holding said locking device in an unlocked position, and a driven member for releasing said feeler to permit operation of said locking device.

12. A target trap comprising a base, a target-support movable in an arcuate course on said base to different target-receiving positions, a throwing arm movable over said target-support to discharge the target therefrom, and means for stopping said support in said target-receiving positions, said means including a locking member provided with a feeler movable with said target support, an abutment member secured to said base and provided with a plurality of stops for said locking member, and a rotatable restraining member provided with a series of recesses for said feeler, said restraining member being in the path of said feeler to prevent said locking member from engaging said stops until said feeler enters one of said recesses.

13. A target trap comprising a base, a carrier movable in an arcuate course on said base, a target support secured to said carrier, a throwing arm movable independently of said target-support to discharge the target therefrom, a spring-actuated crank shaft operatively connected to said throwing arm, a releasable stop secured to said target support for holding said throwing arm in its target-receiving position, a source of power for moving said throwing arm toward said releasable stop while moving the carrier in said arcuate course, and means for unexpectedly stopping said carrier so that the portion of the target-support from which the targets are discharged is unexpectedly located in different positions, said means including a ring gear driven by said source of power, said ring gear having an annular upturned flange provided with a plurality of notches, a slidable stop member movable in an arcuate course with said carrier, an abutment member yieldingly secured to said base and provided with a plurality of slots adapted to receive said slidable stop member, a spring tending to force said slidable stop member onto said abutment member and into one of said slots, and a feeler secured to said slidable stop member and adapted to engage a face of said annular flange during the movement of the slidable stop member in said arcuate course, to prevent said slidable stop from entering one of said slots until said feeler and one of the notches in said flange are in alinement with each other.

14. A target trap comprising an oscillatory target support movable to different positions so as to vary the angles of discharge of the targets, a throwing arm movable over said target support to discharge the targets, a source of power for setting said throwing arm, said target support being driven in one direction by said source of power, and a spring-actuated reversing device for moving said target support in an opposite direction, said spring-actuated reversing device being energized during the movement of said target support in said first-mentioned direction.

15. A target trap comprising a target-support movable to different positions so as to vary the angles of discharge of the targets, a spring-actuated throwing arm for discharging targets from said support, a source of power for energizing the spring while transmitting motion through said spring to move said target-support in one direction, and a spring-actuated reversing device for moving said target-support in an opposite direction.

16. A target trap comprising a target-support movable to different positions so as to vary the angles of discharge of the targets, a spring-actuated throwing arm for discharging targets from said support, a source of power for energizing the spring while transmitting motion through said spring to move said target-support in one direction and a spring-actuated reversing device for moving said target-support in an opposite direction, said spring-actuated reversing device including a reversing spring and a cam cooperating therewith to reverse the movement of said target-support.

17. A target trap comprising an oscillatory carrier provided with a target-support, a throwing arm movable over said support to discharge the targets, a throwing spring to actuate said throwing arm, said spring being connected to said carrier, said target-support being provided with a releasable stop to restrain said throwing arm in its target-receiving position, a source of power for moving the spring-actuated throwing arm toward said stop while transmitting motion through the spring to move said carrier in one direction, means for moving said carrier in an opposite direction after said throwing arm is in contact with said releasable stop, said means including an inclined track secured to said carrier, and a spring-actuated roller seated on said track for driving said carrier in said opposite direction, and means for unexpectedly stopping said target-support at a target-receiving position.

18. A target trap comprising a base, an oscillatory carrier seated on said base, a target-support secured to said carrier, a spring-actuated throwing arm movable over said support to discharge the targets, said target-support being provided with a releasable stop to restrain said throwing arm in its target-receiving position, a source of power for moving said spring-actuated throwing arm toward said stop while transmitting motion through the spring to move said carrier in one direction, a spring-actuated device for simultaneously moving said carrier and throwing arm in an opposite direction after said throwing arm is in contact with said releasable stop, said spring-actuated device including an inclined track secured to said carrier, a roller secured to said base, and a reversing spring tending to force said roller to the lowest portion of said inclined track, said roller being movable upwardly on said track to energize said reversing spring when said carrier is driven in said first mentioned direction, said spring thereafter forcing said roller down said track to move said carrier in said opposite direction, and means for unexpectedly stopping said target support and throwing arm at a target-receiving position.

19. A target trap comprising a base, an oscillatory carrier seated on said base, a target-support secured to said carrier, a spring-actuated throwing arm movable over said support to discharge the targets, said target-support being provided with a releasable stop to restrain said throwing arm in its target-receiving position, a source of power for moving said spring-actuated throwing arm toward said stop while transmitting motion through the spring to move said carrier in one direction, a spring-actuated device for moving said carrier in an opposite direction after said throwing arm is in contact with said releasable stop, said spring-actuated device including an inclined track secured to said carrier, a roller secured to said base, and a reversing spring tending to force said roller to the lowest portion of said inclined track, said roller being movable upwardly on said track to energize said reversing spring when said carrier is driven in said first mentioned direction, said reversing spring being adapted to force said roller down said track to move the carrier in said opposite direction, said base being provided with positive stops to limit the motion of said carrier in both of said directions, and the ends of said inclined track having abrupt extensions to yieldingly retard the carrier before it contacts with the positive stops on said base, and means for unexpectedly stopping said target support and throwing arm at a target-receiving position.

20. A target trap comprising a target-support movable in an arcuate course to different target-receiving positions, a throwing arm to discharge the targets, a spring-actuated crank shaft operatively connected to said throwing arm, and a locking device for selectively stopping and restraining said support at said target-receiving positions, said locking device including a series of stops, a slidable locking member adapted to engage the respective stops, and a feeler cooperating with said slidable locking member to selectively permit engagement of said locking member with said stops, said crank shaft being provided with a cam for shifting said slidable locking member after the discharge of the targets to disengage said locking member from the previously selected stop.

21. A target trap comprising a target-support movable in an arcuate course to different target-receiving positions, a throwing arm to discharge the targets, a spring-actuated crank shaft operatively connected to said throwing arm, and a locking device for selectively stopping and restraining said support at said target-receiving positions, said locking device including a series of stops, a spring-actuated slidable locking member adapted to engage the respective stops, a rotatable member having an annular flange provided with a plurality of notches, and a feeler secured to said slidable locking member, said annular flange having an abutment face contacting with said feeler to prevent said slidable locking member from engaging said stops until said feeler and one of the notches in said flange are in alinement with each other, and an unlocking cam on said crank shaft to unlock said slidable locking member and restore said feeler to said abutment face.

22. A target trap comprising an oscillatory target-support movable to different target-receiving positions, a throwing arm movable over said support to discharge the targets, said target-support being provided with a releasable stop to restrain said throwing arm in its target-receiving position, a source of power for moving the throwing arm toward said stop while moving said target-support in one direction, means for moving said support in an opposite direction after said throwing arm is in contact with said releasable stop, a locking device for stopping the movement of said support to determine the target-receiving position of said support, and unlocking means for releasing said target-support from a position at the end of its travel in the first mentioned direction, said unlocking means being effective while the throwing arm is moving toward said stop.

23. A target trap comprising an oscillatory target-support movable to different target-receiving positions, a throwing arm movable over said support to discharge the targets, said target-support being provided with a releasable stop to restrain said throwing arm in its target-receiving position, a source of power for moving the throwing arm toward said stop while moving said target-support in one direction, means for moving said support in an opposite direction after said throwing arm is in contact with said releasable stop, a locking device for stopping the movement of said support to determine the target-receiving position of said support, and unlocking means for releasing said target-support from a position at the end of its travel in the first mentioned direction and while the throwing arm is moving toward said stop, said unlocking means including a cam in the path of said locking device.

24. A target trap provided with a throwing member for discharging the targets, operating means for driving and controlling said throwing member, said means including a spring-actuated crank shaft operatively connected to said throwing member, and a variable stop device for stopping said throwing member, while subjected to the tension of said spring, at different distances beyond the dead center of said crank shaft, to vary the discharge stroke of said throwing member, said variable stop device including a stop member, a series of abutments cooperating with said stop member to stop the throwing member in different target-receiving positions, and an adjusting member through which motion is transmitted from said operating means to said variable stop device, so as to automatically adjust said stop device.

25. A target trap comprising a throwing arm for discharging the targets, a releasable stop member for holding said throwing arm in a position from which it is released to discharge the target, and means for stopping said throwing arm in different positions with respect to said stop member, said means including a stop device slidably secured to said throwing arm and adapted to contact with said releasable stop member to limit the motion of said throwing arm, a variable abutment member cooperating with said slidable stop device to vary the movement of said throwing arm, and a shifter actuated during the movement of said throwing arm to locate said abutment member in different positions.

26. A target trap comprising a target-support, a throwing arm for discharging a target from said support, a spring-actuated crank shaft operatively connected to said throwing arm, a source of power for driving said crank shaft and throwing arm to a set position from which said throwing arm is releasable to discharge the target, and means for automatically varying the discharge stroke of said throwing arm, said means including a releasable stop member secured to said target-support, a slidable device secured to said throwing arm and adapted to contact with said releasable stop member to limit the motion of said throwing arm, a rotatable member provided with abutment faces in different planes, said slidable device including a stop member movable onto said abutment faces to determine the position said throwing arm will occupy with respect to said releasable stop member, and means for moving said rotatable member to successively aline said abutment faces with the stop member on said slidable device.

27. A target trap comprising a target-support, a rotary throwing arm for discharging a target from said support, a spring-actuated crank shaft operatively connected to said throwing arm, a source of power for driving said crank shaft and throwing arm from one dead center position of said crank shaft to a position slightly beyond another dead center position of said crank shaft where said crank shaft is subjected to the tension of said spring, and means for automatically stopping said throwing arm at different distances beyond the last mentioned dead center position of said crank shaft, said means including a releasable stop member secured to said target-support, a stop device slidably secured to said throwing arm and adapted to contact with said releasable stop member to limit the motion of said throwing arm, a cylinder provided with recesses of varying depths, a pin secured to said slidable stop device and adapted to enter one of said recesses when said slidable stop device strikes said releasable stop member, and means whereby said cylinder is moved in response to the movements of said throwing arm to change the locations of the varying recesses with respect to said pin, said last mentioned means including a toothed wheel secured to said cylinder, and a member on said target support in the path of said wheel when said throwing arm is moved to tension said spring.

28. A target trap provided with a throwing arm to discharge the targets, and automatic means for varying the discharge stroke of said throwing arm, said automatic means including a variable stop device provided with stop members to stop the throwing arm in different target-receiving positions, and a shock-absorbing spring tending to separate said stop members from each other.

29. A target trap provided with a throwing arm to discharge the targets, and automatic means for varying the discharge stroke of said throwing arm, said automatic means including a variable stop device provided with stop members to stop the throwing arm in different target-receiving positions, a shock-absorbing spring tending to separate said stop members from each other, and a weaker shock-absorbing spring tending to force said stop members toward each other.

30. A target trap comprising a throwing arm for discharging targets, a releasable stop member for holding said throwing arm in its target-receiving positions, and means for stopping said throwing arm at different positions with respect to said releasable stop member, said means including a stop device slidably secured to said throwing arm and adapted to contact with said releasable stop member to limit the motion of said throwing arm, a variable abutment member cooperating with said slidable stop device to vary the target-receiving positions of said throwing arm, and a shock-absorbing spring tending to separate said slidable stop device from said variable abutment member.

31. A target trap comprising a throwing arm for discharging targets, a releasable stop member for holding said throwing arm in its target-receiving positions, and means for stopping said throwing arm at different positions with respect to said releasable stop member, said means including a stop device slidably secured to said throwing arm and adapted to contact with said releasable stop member to limit the motion of said throwing arm, a variable abutment member cooperating with said slidable stop device to vary the target-receiving positions of said throwing arm, a shock-absorbing spring tending to separate said slidable stop device from said variable abutment member, and another shock-absorbing spring tending to force said slidable stop device toward said abutment member.

32. A target trap comprising a throwing arm and a target-support movable about substantially the same axis, a stop device to restrain said target-support during the throwing movement of said arm, and operating means whereby both the throwing-arm and target support are movable independently of each other about said axis.

33. A target trap comprising a throwing arm and a target-support movable about substantially the same axis, a stop device to restrain said target-support during the throwing movement of said arm, and operating means whereby both the throwing-arm and target-support are movable independently of each other about said axis, said operating means including a spring connected to said target-support.

34. A target trap comprising a target support, a throwing arm for discharging targets from said support, a stop member for holding said throwing arm in a set position from which it is releasable to discharge the target, means for stopping said throwing arm in different positions with respect to said stop member so as to vary the discharge stroke of said throwing arm, and means to locate the target at varying distances from the axis of said throwing arm in accordance with variations in the stroke of said arm, the last mentioned means including a target stop which cooperates with said throwing arm to fix the starting point of the target, said target stop having a target-receiving abutment at an obtuse angle to a radial line drawn from the axis of said throwing arm, so as to provide a starting point for the target relatively close to said axis when the arm is set for a long stroke and more remote from the axis when said arm is set for a shorter stroke.

35. A target trap provided with a throwing arm to discharge the target, a source of power for setting said throwing arm, and a centrifugally controlled clutch for connecting said throwing arm to said source of power, said centrifugally controlled clutch including a clutch member centrifugally held in an inoperative position during the rapid discharge stroke of the throwing arm.

36. A target trap provided with a throwing arm to discharge the target, a spring to rapidly actuate said throwing arm, a source of power for energizing said spring, and means for preventing the transmission of power from said source to said spring during the rapid movements of said throwing arm, said means including a centrifugal clutch member through which said power is transmitted, said clutch member being connected to said spring and throwing arm, so as to occupy inoperative positions in response to centrifugal force during the rapid movements of said throwing arm, and said centrifugal clutch member being free to move to its operative position in response to a substantial decrease in the speed of said movements.

37. A target trap provided with a throwing arm to discharge the target, a spring to actuate said throwing arm, a source of power for energizing said spring, and a centrifugal clutch through which the power is transmitted to said spring, said clutch including a centrifugally energized clutch member connected to and driven by said spring, so as to occupy inoperative positions during the rapid movements of said throwing arm, and said centrifugally energized clutch member being movable to its operative position in response to a substantial decrease in the speed of said movements.

38. A target trap provided with a throwing arm to discharge the target, a spring to actuate said throwing arm, a source of power for energizing said spring, and a centrifugal clutch through which the power is transmitted to said spring, said centrifugal clutch including a driving clutch member connected to said source of power, and a driven clutch member yieldingly supported adjacent to the periphery of said driving clutch member and movable in response to centrifugal force, said driven clutch member being connected to said spring and throwing arm and adapted to engage said driving clutch member, said driven clutch member being connected to said spring and throwing arm and centrifugally held in inoperative positions during the rapid movements of said throwing arm, and said centrifugal clutch member being movable toward said driving clutch member in response to a substantial decrease in the speed of said throwing arm.

39. A target trap comprising a crank shaft provided with a throwing arm to discharge the target, a spring to actuate said crank shaft and throwing arm, a source of power for energizing said spring, and a centrifugal clutch through which the power is transmitted to said spring, said centrifugal clutch including a constantly rotating driving clutch member loosely surrounding said crank shaft and connected to said source of power, a carrier secured to said crank shaft, and a centrifugal clutch member pivoted to said carrier and adapted to engage the periphery of said driving clutch member, said centrifugal clutch member being carried around the axis of said crank shaft and centrifugally held in inoperative positions during the rapid movements of said shaft and throwing arm, and said centrifugal clutch member being movable toward said driving clutch member in response to a decrease in the speed of said shaft and throwing arm.

40. A target trap comprising a throwing arm for discharging the target, a spring actuated crank shaft operatively connected to said throwing arm, a stop member for holding said throwing arm in a set position from which it is releasable to discharge the target, a source of power for setting said throwing arm and energizing said spring, and means for controlling the transmission of motion from said source of power through said crank shaft to said throwing arm, said means including clutch members through which the power is transmitted, one of said clutch members being centrifugally held in an inoperative position during the rapid discharge stroke of the throwing arm, a shifter to release said clutch members, and a cam located in the path of said shifter to disconnect said source of power before said throwing arm reaches said stop member.

41. A target trap comprising a throwing arm for discharging the target, an actuated crank shaft operatively connected to said throwing arm, a throwing spring connected to the crank of said shaft, a stop member for holding said throwing arm in a set position from which it is releasable to discharge the target, a source of power for setting said throwing arm and energizing said spring, and means for controlling the transmission of motion from said source of power through said crank shaft to said throwing arm, said means including a driving clutch member loosely mounted on said crank shaft and continuously operated by said source of power, a pivoted clutch member secured to said crank shaft and adapted to engage said driving clutch member to provide for the transmission of power to said crank shaft, and a cam in the path of a portion of said pivoted clutch member to release it from said driving clutch member before said throwing arm reaches said stop member, said pivoted clutch member being separated from said driving clutch member by centrifugal force while said throwing arm is subjected to the rapid throwing motion of said crank shaft, and said pivoted clutch member being free to engage said driving clutch member in response to a substantial decrease in the speed of said crank shaft.

42. A target trap comprising a throwing arm for discharging the target, a crank shaft operatively connected to said throwing arm, a throwing spring connected to the crank of said shaft, a stop member for holding said throwing arm in a set position from which it is releasable to discharge the target, a source of power for setting said throwing arm and energizing said spring, and means for controlling the transmission of motion from said source of power through said crank shaft to said throwing arm, said means including a continually driven ratchet wheel loosely mounted on said crank shaft, a pivoted dog secured to said crank shaft and adapted to engage said ratchet wheel to provide for the transmission of power to said crank shaft to set said throwing arm, and a cam in the path of a portion of said dog to positively release the dog from said ratchet wheel before said throwing arm reaches said stop member, said pivoted dog being separated from said ratchet wheel by centrifugal force while said throwing arm is subjected to the rapid motion imparted by the spring during the discharge of the target, said dog being provided with a weighted portion to aid the centrifugal action, and said dog being free to drop into engagement with said ratchet wheel in response to a substantial reduction in the speed of said spring-actuated crank shaft.

43. A target trap comprising a throwing arm to discharge the targets, said throwing arm being adjustable in one direction to vary the angle of discharge of the targets, and also adjustable in another direction to vary its angle of elevation, operating means for energizing said throwing arm, and adjusting devices driven by said operating means to shift said arm in both of said directions.

44. A target trap comprising a throwing arm to discharge the targets, said throwing arm being adjustable in an arcuate course to vary the angle of discharge of the targets, and also tiltable in another direction to vary its angle of elevation, operating means for energizing said throwing arm, and adjusting devices driven by said operating means to unexpectedly determine the flight of the target.

45. A target trap comprising a target-support, a throwing arm to discharge the targets from said support, said target-support being adjustable in one direction to vary the angle of discharge of the targets, said throwing arm being adjustable in another direction to vary its angle of elevation, operating means for energizing said throwing arm, and adjusting devices driven by said operating means to shift said target-support and throwing arm in said directions.

46. A target trap comprising a target-support, a throwing arm to discharge the targets from said support, a universal coupling through which motion is transmitted to said throwing arm, said target-support being adjustable in one direction to vary the angle of discharge of the targets, and also adjustable in another direction to vary its angle of elevation, said throwing arm being pivotally secured to said target-support, operating means for energizing said throwing arm, and adjusting devices driven by said operating means to shift said target-support and throwing arm in both of said directions.

47. A target trap comprising a throwing arm having a variable discharge stroke to throw targets at different velocities, said throwing arm being adjustable in one direction to vary the angle of discharge of the targets, and also adjustable in another direction to vary its angle of elevation, operating means for energizing said throwing arm, and adjusting devices driven by said operating means to shift said arm in both of said directions.

48. A target trap provided with a throwing member movable at different speeds to throw targets at different velocities, operating means for energizing said throwing member, and an automatic device for varying the energy transmitted from said operating means to said throwing member, said automatic device including an adjusting member driven in response to movements of said operating means.

49. A target trap provided with a throwing member movable at different speeds to throw targets at different velocities, a spring-actuated crank shaft operatively connected to said throwing member, and a variable stop member for stopping said throwing member while subjected to the tension of said spring, at different distances beyond the dead center of said crank shaft, so as to vary the tension of said spring, and an adjusting member driven in response to movements of said crank shaft to actuate said variable stop member.

HENRY E. WINANS.